United States Patent
Chan et al.

(10) Patent No.: US 10,552,805 B2
(45) Date of Patent: Feb. 4, 2020

(54) SYSTEMS AND METHODS FOR MONITORING REFERRALS

(71) Applicant: The Toronto-Dominion Bank, Toronto (CA)

(72) Inventors: Paul Mon-Wah Chan, Toronto (CA); Jonathan K. Barnett, Toronto (CA); John Jong Suk Lee, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 673 days.

(21) Appl. No.: 15/235,199

(22) Filed: Aug. 12, 2016

(65) Prior Publication Data

US 2017/0046638 A1 Feb. 16, 2017

Related U.S. Application Data

(60) Provisional application No. 62/204,768, filed on Aug. 13, 2015.

(51) Int. Cl.
*G06Q 20/06* (2012.01)
*G06F 21/64* (2013.01)
(Continued)

(52) U.S. Cl.
CPC ......... *G06Q 20/0655* (2013.01); *G06F 21/62* (2013.01); *G06F 21/645* (2013.01); *G06Q 10/0631* (2013.01); *G06Q 10/063114* (2013.01); *G06Q 10/08* (2013.01); *G06Q 10/103* (2013.01); *G06Q 10/1097* (2013.01); *G06Q 20/065* (2013.01); *G06Q 20/102* (2013.01); *G06Q 20/367* (2013.01); *G06Q 20/3829* (2013.01); *G06Q 20/401* (2013.01); *G06Q 20/405* (2013.01); *G06Q 20/4016* (2013.01); *G06Q 30/0214* (2013.01); *G06Q 40/08* (2013.01); *G06Q 40/128* (2013.12); *G06Q 50/08* (2013.01);
(Continued)

(58) Field of Classification Search
None
See application file for complete search history.

(56) References Cited

U.S. PATENT DOCUMENTS

2003/0191669 A1 * 10/2003 Fitzgerald ............. G06F 19/328
705/2
2009/0259547 A1 * 10/2009 Clopp .................... G06Q 30/02
705/14.16
(Continued)

*Primary Examiner* — Thomas L Mansfield
(74) *Attorney, Agent, or Firm* — Duane Morris LLP

(57) ABSTRACT

A system includes a first client device that is coupled to a second client device. An apparatus, coupled to the first and second devices, includes a storage device coupled to a processor. The storage device stores software instructions for controlling the processor that when executed configures the processor to generate a listing of expected values and referral events associated with a tracked matter. Each referral event corresponds to a different expected value and the distributed listing includes a sequence of units corresponding to different expected values and corresponding referral events. The processor receives a notification from one of the first or second device that is representative of a referral operation between the first and second location. The processor determines an outcome value for the referral operation and identifies whether the determined outcome value is accurate based on the distributed listing.

23 Claims, 7 Drawing Sheets

(51) Int. Cl.

| | |
|---|---|
| *H04N 5/913* | (2006.01) |
| *G06Q 20/36* | (2012.01) |
| *G06Q 10/06* | (2012.01) |
| *G06Q 10/10* | (2012.01) |
| *G06Q 50/08* | (2012.01) |
| *G06Q 20/10* | (2012.01) |
| *G06Q 20/40* | (2012.01) |
| *G06F 21/62* | (2013.01) |
| *H04L 9/08* | (2006.01) |
| *G06Q 50/18* | (2012.01) |
| *H04L 9/32* | (2006.01) |
| *H04L 29/06* | (2006.01) |
| *G06Q 10/08* | (2012.01) |
| *G06Q 30/02* | (2012.01) |
| *G06Q 40/00* | (2012.01) |
| *G06Q 40/08* | (2012.01) |
| *G06Q 20/38* | (2012.01) |

(52) U.S. Cl.
CPC ............ *G06Q 50/18* (2013.01); *H04L 9/0816* (2013.01); *H04L 9/0861* (2013.01); *H04L 9/0891* (2013.01); *H04L 9/0894* (2013.01); *H04L 9/3247* (2013.01); *H04L 63/061* (2013.01); *H04L 63/062* (2013.01); *H04L 63/0876* (2013.01); *H04N 5/913* (2013.01); *G06Q 2220/00* (2013.01); *G06Q 2220/10* (2013.01); *G06Q 2230/00* (2013.01); *H04L 63/0435* (2013.01); *H04L 63/0442* (2013.01); *H04L 63/08* (2013.01); *H04L 63/12* (2013.01); *H04L 2209/24* (2013.01); *H04L 2209/38* (2013.01); *H04L 2209/56* (2013.01); *H04N 2005/91342* (2013.01); *Y02P 90/86* (2015.11); *Y04S 10/54* (2013.01)

(56) References Cited

U.S. PATENT DOCUMENTS

| | | | |
|---|---|---|---|
| 2015/0154527 A1* | 6/2015 | Gill | .................. G06Q 10/06395 |
| | | | 705/7.41 |
| 2015/0161541 A1* | 6/2015 | Brennan | .......... G06Q 10/06311 |
| | | | 705/7.15 |

* cited by examiner

| Name: Bob Smith | | | | | | Other Ledger | |
|---|---|---|---|---|---|---|---|
| Time Stamp | Activity Entry | Sender | Receiver | Actual Value | Lead Value | Actual Value | Lead Value |
| 3:01pm - 11/10/14 | Booked appt for mortgage | Easyweb | MMS – John | | $500K | | John:($500K) |
| 3:00pm - 11/11/14 | Acquired mortgage for $800K | MMS – John | RESL | $800k | ($500K) | John:($800K) | |
| 7:01pm - 12/01/14 | Branch identified need for wealth management services | CSR – Amy | Wealth FSR – Kim | | $400K | | Kim: ($400K) |
| 11:30am - 2/05/15 | $1MM transfer to wealth | Wealth FSR – Kim | Wealth | $1MM | ($400K) | Kim: (1MM) | |
| 7:01pm - 7/16/15 | Shared promotion on Facebook with Tim for new infinite card | Bob | Tim | | ($1K) | | Tim $1K |

FIG. 5A

SYSTEMS AND METHODS FOR MONITORING REFERRALS

CROSS-REFERENCE TO RELATED APPLICATIONS

This application claims the benefit of U.S. Provisional Patent Application No. 62/204,768, filed Aug. 13, 2015, which is expressly incorporated by reference herein to its entirety.

BACKGROUND

At least some known commercial organizations, such as, multinational corporations, often link together multiple, fragmented, and geographically dispersed business units and lines-of-business. For example, each organization may have different departments or units that have different roles within the organization. While operating within a common organization, various interactions can take place. For example, one business unit in an organization may provide a referral to another business unit within the organization.

At least some known customer interactions and referrals are not limited to just one organization. Business relationships can involve the interaction between multiple parties from different organizations that may be driven by a single goal. For example, in at least some known real estate matters, a bank teller at one organization may refer a customer to a personal finance manager in the same organization who, in turn, may refer the customer to a real estate agent at another organization. The real estate agent may then refer the customer to a mortgage broker at yet another organization.

Tracking the origins and identifying a quantification of such referrals and transactions can be challenging within one organization and across multiple organizations. For example, within one organization, the fragmented nature of distinct business units and lines of businesses (LOB) may render complex any attempt to accurately identify and capture the various points of customer interaction involving such cross-line-of-business referrals across the organization. Further, devices operating in separate organizations and/or operating within business units in one organization may execute various different types of mutually-incompatible software applications (with corresponding mutually-incompatible data inputs and outputs). As such, the timely aggregation of data captured across different organizations and/or across different business units in one organization, and the dissemination of the aggregated data can be challenging.

SUMMARY

The embodiments described herein enable the monitoring of referrals, including the quantification of referrals, between different units within one organization and/or between different organizations, by using a hybrid-block chain ledger architecture such that the referrals can be tracked without the need to reveal confidential compensation information between parties.

For example, in some embodiments, a system is provided. The system includes a first client device and a second client device that is coupled to the first client device. An apparatus is coupled to the first client device and to the second client device, wherein the apparatus includes a storage device and a processor coupled to the storage device. The storage device stores software instructions for controlling the processor that when executed configures the processor to generate at least one distributed ledger or listing of a plurality of expected values and a plurality of referral events associated with a tracked matter, wherein each referral event corresponds to a different expected value and the distributed listing includes a block-chain or a sequence of a plurality of units such that each block or unit corresponds to a different expected value and the corresponding referral event. The processor is also configured to receive a notification from one of the first client device or the second client device, wherein the notification is representative of at least one referral operation between the first client device and the second client device that is related to the tracked matter. The processor is also configured to determine an outcome value for the referral operation and to identify whether the determined outcome value is accurate based on the distributed listing of the expected values and the referral events.

In other embodiments, a method for monitoring at least one referral operation between at least one first location and at least one second location is provided. A computer processor communicates with a first client device and the computer processor communicates with a second client device coupled to the first client device. At least one distributed ledger or listing of a plurality of expected values and a plurality of referral events associated with a tracked matter is generated, using the computer processor. Each referral event corresponds to a different expected value and the distributed listing includes a block chain or a sequence of a plurality of units such that each block or unit corresponds to a different expected value and the corresponding referral event. A notification is received from one of the first client device or the second client device, wherein the notification is representative of at least one referral operation between the first client device and the second client device that is related to the tracked matter. An outcome value for the referral operation is determined. The method also includes identifying whether the determined outcome value is accurate based on the distributed listing of the expected values and the referral events.

In some embodiments, at least one computer-readable storage medium having computer-executable instructions embodied thereon is provided. When executed by at least one processor, the computer-executable instructions cause the processor to communicate with a first client device and to communicate with a second client device. The computer-executable instructions further cause the processor to generate at least one distributed ledger or listing of a plurality of expected values and a plurality of referral events associated with a tracked matter, wherein each referral event corresponds to a different expected value and the distributed listing includes a block-chain or sequence of a plurality of units such that each block or unit corresponds to a different expected value and the corresponding referral event. The computer-executable instructions also cause the processor to receive a notification from one of the first client device or the second client device, wherein the notification is representative of at least one referral operation between the first client device and the second client device that is related to the tracked matter. The computer-executable instruction also cause the processor to determine an outcome value for the referral operation and to identify whether the determined outcome value is accurate based on the distributed listing of the expected values and the referral events.

It is to be understood that both the foregoing general description and the following detailed description are exemplary and explanatory only, and are not restrictive of the disclosed embodiments as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

The following will be apparent from elements of the figures, which are provided for illustrative purposes and are not necessarily to scale.

FIGS. 5A and 5B are diagrams of exemplary customer-specific accounting ledgers in accordance with some embodiments of the present disclosure.

DETAILED DESCRIPTION

Figure 1:
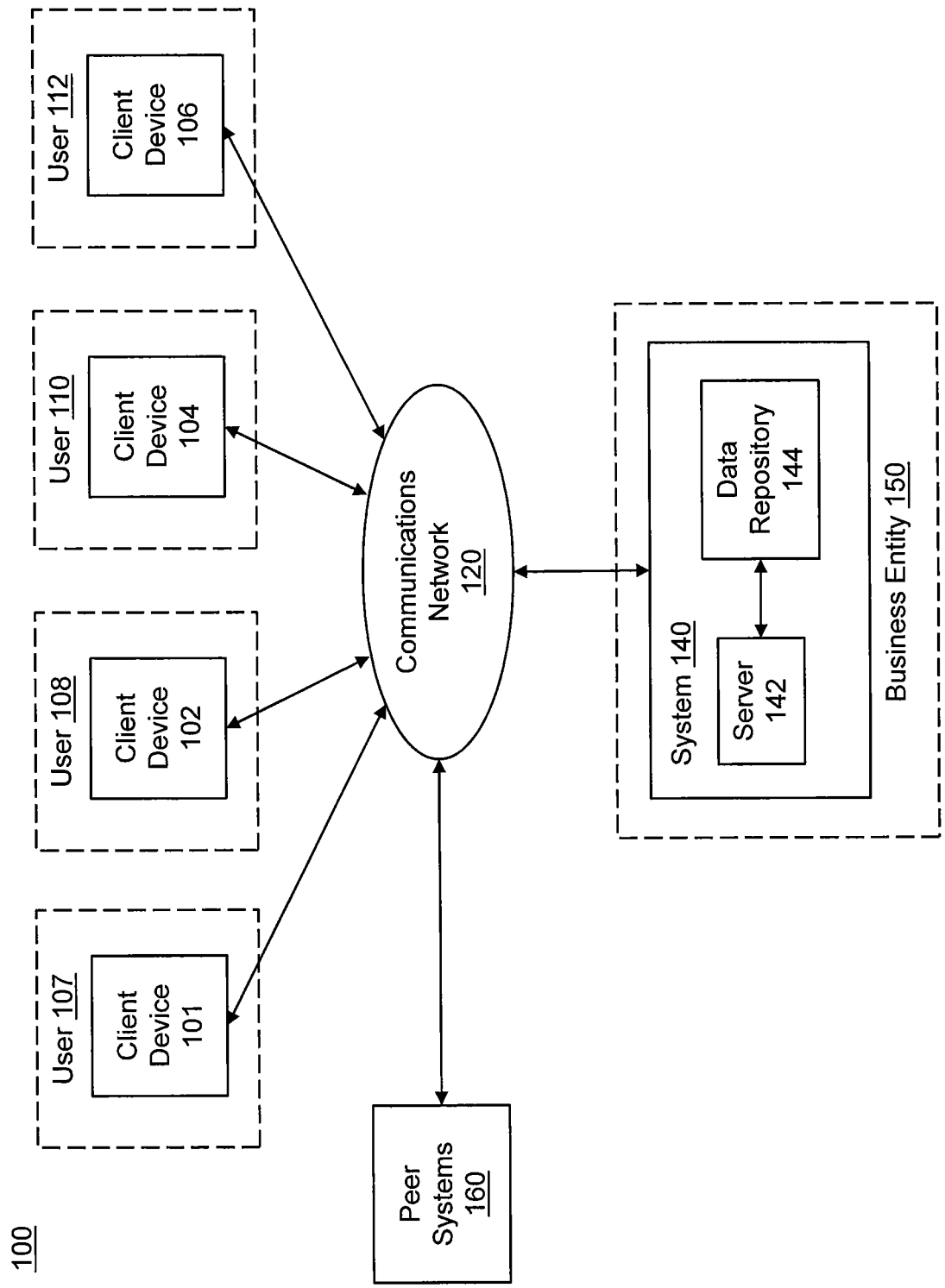
FIG. 1 is a diagram of an exemplary system in accordance with some embodiments of the present disclosure.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

FIG. 1 illustrates an exemplary system 100 in accordance with some embodiments of the present disclosure, wherein system 100 is configured to enable monitoring referrals that are made between different organizations, such as different and separate companies, and/or referrals that are made between different units within the same organization, such as between the legal department and the finance department within the same company. In one aspect, system 100 may be a computing environment including client devices 101, 102, 104, and 106 that are positioned in different locations and/or associated with different locations. For example, in some embodiments, client device 101 may be positioned with and/or associated with a customer and client devices 102, 104, and 106 may each be positioned in and/or associated with different organizations, such as different companies. In some embodiments, client devices 102, 104, and 106 may each be positioned in and/or associated with different units or departments within the same organization.

System 100 also includes system 140, peer systems 160, and a communications network 120 connecting or coupling one or more of the components of system 100. For example, client devices 101, 102, 104, and 106 may be coupled to each other. It should be noted that, as used herein, the term "couple" is not limited to a direct mechanical, fluid, thermal, communication, and/or an electrical connection between components, but may also include an indirect mechanical, fluid, thermal, communication and/or electrical connection between multiple components.

Consistent with the disclosed embodiments, one or more of the components of system 100 may be configured to address problems inherent to conventional block-chain-based ledgers by embedding a private-master encryption key architecture into a conventional block-chain architecture (e.g., a block-chain-based architecture associated with the public Bitcoin™ ledger). In some aspects, the resulting hybrid block-chain architecture may facilitate a selective encryption of information by client devices 102, 104, and 106, system 140, and/or peer systems 160, thus providing a technical solution that protects sensitive and/or confidential instructions sets and event triggers and corresponding confidential instructions sets.

Exemplary Client Devices

In one embodiment, client devices 101, 102, 104, and/or 106 may include a computing device, such as, but not limited to, a hashing computer, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device(s), consistent with disclosed embodiments. In certain embodiments, at least one of client devices 102, 104, and/or 106 may be associated with one or more users at different organizations or at different business units within the same organization, such as users 108, 110, and/or 112, and client device 101 may be associated with a customer of the organizations, such as user 107. In some embodiments, user 110 may operate client device 104 and may do so to cause client device 104 to perform one or more operations consistent with the disclosed embodiments.

Client devices 101, 102, 104, and/or 106 may include one or more tangible, non-transitory memories that store data and/or software instructions, and one or more processors configured to execute software instructions. Client devices 101, 102, 104, and/or 106 may include one or more display devices that display information to a user and one or more input device(s) to allow the user to input information to client device 101, 102, 104, and/or 106 (e.g., keypad, keyboard, touchscreen, voice activated control technologies, or any other type of known input device).

In one aspect, client devices 101, 102, 104, and/or 106 may store in memory one or more software applications that run on client device 104 and are executed by the one or more processors. In some instances, client device 104 may store software applications that, when executed by one or more processors, perform operations that establish communications with one or more of peer systems 160 (e.g., across network 120) and that obtain, from peer systems 160, a current version of a hybrid block-chain ledger generated and maintained in accordance with the disclosed embodiments.

In other instances, and as described below, one or more of client devices 101, 102, 104, and/or 106 may execute the one or more stored software application and to obtain data from the hybrid block-chain ledger that includes, but not limited to, data identifying one or more tracked assets, and/or a public key of one or more users. Further, and as described below, the one or more executed software applications may cause client devices 101, 102, 104, and/or 106 to extract, from the one or more accessed blocks, a copy of an encrypted and/or hashed ownership/rules portion of the transaction block (e.g., including the identification a holder of a master key) and/or a copy of an encrypted and/or hashed master data block (e.g., encrypted using the master key and including rules permitting preconfigured and/or actions involving the tracked assets). In additional instances, and as further described below, client devices 101, 102, 104, and/or 106 may provide information associated with one or more actions or transactions involving the tracked assets (e.g., information identifying the actions or transaction, information identifying the assets, a public key, a digital signature, etc.) to peer systems 160, along with copies of the encrypted and/or hashed rules engines and lists of triggering events.

In some aspects, the one or more stored applications may include a wallet application provided by business entity 150 (e.g., a mobile wallet application or an application executable on a desktop computer) and capable of initiating transactions denominated in one or more currencies, including virtual currencies such as Bitcoin™.

Exemplary Computer Systems

As illustrated in FIG. 1, system 140 may be a computing system configured to execute software instructions to perform one or more operations consistent with disclosed embodiments. In one aspect, system 140 may be associated with a business entity 150 (e.g., a financial institution) that provides financial accounts, financial services transactions, and investment services one or more users (e.g., customers of the business entity 150). In some aspects, system 140 may be a distributed system that may include computing components distributed across one or more networks, such as network 120, or other networks.

In one aspect, system 140 may include computing components configured to store, maintain, and generate data and software instructions. For example, system 140 may include one or more servers (e.g., server 142) and tangible, non-transitory memory devices (e.g., data repository 144). Server 142 may include one or more computing devices that may be configured to execute software instructions to perform one or more processes consistent with the disclosed embodiments. In one example, server 142 may be a computing device that executes software instructions that perform operations that provides information to one or more other components of system 100.

In one embodiment, server 142 may include a computer (e.g., a personal computer, network computer, or mainframe computer) having one or more processors that may be selectively activated or reconfigured by a computer program. In one aspect, server 142 (or other computing components of system 140) may be configured to provide one or more websites, digital portals, etc., that provide services consistent with business entity 150, such as a digital banking or investment portal, and services consistent with disclosed embodiments. For instance, server 142 may be configured to provide information associated with a requested web page over communications network 120 to client device 104, which may render the received information and present content from the web page on a display device, e.g., a touchscreen display unit.

In other aspects, server 142 (or other computing components of system 140) may be configured to provide information to one or more application programs executed by client device 104 (e.g., through a corresponding application programming interface (API)). For example, client device 104 may execute an application program associated with and provided by business entity 150, such a mobile banking application and/or a mobile wallet application, to provide services consistent with the disclosed embodiments. In some instances, server 142 may provide information to client devices 102, 104, and/or 106 (e.g., through the API associated with the executed application program), and client devices 101, 102, 104, and/or 106 may be configured by the executed application program to present portions of the information to corresponding users through a corresponding graphical user interface (GUI).

In further aspects, server 142 (or other computing components of system 140) may be configured to provide to client devices 101, 102, 104, and/or 106 (and/or receive from client device 104) information associated with services provided by business entity 150. For example, client device 104 may receive the transmitted information, and store portions of the information in locally accessible storage device and/or network-accessible storage devices and data repositories (e.g., cloud-based storage). In one instance, client device 104 may execute stored instructions (e.g., an application program, a web browser, a mobile banking application, and/or a mobile wallet application) to process portions of the stored data and render portions of the stored data for presentation to user 110. Additionally, server 142 may be incorporated as a corresponding node in a distributed network, and additionally or alternatively, as a corresponding networked server in a cloud-computing environment. Furthermore, server 142 may communicate via network 120 with one or more additional servers (not shown), which may facilitate the distribution of processes for parallel execution by the additional servers.

In further aspects, business entity 150 may represent a "controlling entity" capable of regulating transactions assets (e.g., units of virtual currency, units of various financial instruments, physical assets, etc.) tracked within hybrid public-private ledgers consistent with the disclosed embodiments. By way of example, one or more computing components of system 140 (e.g., server 142) may be configured (e.g., by executed software instructions) to establish one or more rules that regulate a distributions of and/or transactions associated with the tracked assets, an initiation of transfers of the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets tracked in the hybrid public-private ledger, etc.).

Additionally, in some aspects, system 140 may establish causal relationships between one or more of the established rules and one or more events that trigger an initiation of one or more corresponding regulated distributions, transfers, and/or other actions involving assets tracked within the hybrid public-private ledger (e.g., "triggering events"). For example, a confirmed loss of a private cryptographic key issued to user 110 may represent a triggering event that causes system 140 to verify user 110's identity, initiate a transaction of the orphaned assets, generate a new pair of public and private cryptographic keys for user 110 (i.e., public and private block-chain keys), and transmit at least the private block-chain key to user 110 through secure, non-accessible processes, in accordance with one or more of the established rules.

Further, by way of example, a theft of a portion of user 110's tracked assets (e.g., units of virtual currency specified within one of more blocks of the hybrid public-private ledger) may represent a triggering event that causes system 140 to initiate a recovery protocol to generate a transaction request to recover the value of the stolen assets (e.g., to transfer the stolen assets back to user 110), and further, to generate a new pair of public and private block-chain keys for user 110, as described above. In other instances, a death and/or incapacitation of user 110 may represent a triggering event that causes system 140 to initiate a series of transaction to distribute of at least a portion of the tracked assets (e.g., through corresponding transaction requests consistent with the disclosed embodiments) to one or more additional owners identified by user 110 and specified within corresponding ones of the identified rules.

In some aspects, system 140 may be configured to establish one or more of the rules, and further, one or more of the causal relationships and triggering events, based on internal regulations associated with business entity 150. For example, the one or more internal regulations associated with business entity 150 may specify that system 140 verify an identity of user 110 (e.g., based on various forms of multi-factor authentication data) and/or obtain specific elements of documentation (e.g., a police report, etc.) prior to initiating the lost private key protocol and/or the recovery protocols outlined above. In other aspects, system 140 may one or more of the rules and/or triggering events based on information received from user 110 (e.g., as input provided to a web page or other graphical user interface (GUI) presented by client device 104 and provided to system 140). For example, user 110 may specify, as input to the web page or GUI presented by client device 104, one or more individuals that would receive portions of the tracked assets upon completion of one or more tasks and/or in the event of user 110's accidental death. The disclosed embodiments are, however, not limited to the exemplary triggering events and established rules described above, and in further aspects, the disclosed embodiments may be configured to generate any additional or alternate user- and system-specified rules and triggering events consistent with the hybrid public-private ledger and appropriate to the tracked assets, user 110, and/or business entity 150 (i.e., acting as a centralized authority for the hybrid public-private ledger).

Further, and as outlined below, system 140 may be configured to store the one or more established rules (e.g., as a rules engine) and one or more of the established trigger events (e.g., as an event trigger list) within a portion of a local data repository (e.g., data repository 144). Additionally or alternatively, system 140 may be configured to store portions of the rules engine and/or event trigger list within a secure data repository accessible to system 140 across network 140 (e.g., cloud-based storage).

As described above, one or more computing components of system 140 (e.g., server 142) may be configured to generate pairs of public and private block-chain keys for user 110 (e.g., user 110's public/private block-chain key pair), and to provide the generated private block-chain key to user 110 through secure, non-accessible and/or out-of-band communications (e.g., by mail, etc.). In further embodiments, the one or more components of system 140 (e.g., server 142) may be configured to generate and maintain additional cryptographic keys that facilitate a generation and maintenance of portions of the hybrid public-private ledger. For instance, system 140 may be configured to generate a master key, which system 140 may leverage to encrypt the stored rules engine. In certain aspects, system 140 may store copies of the generated master key in a portion of data repository 144 that is not accessible to user 110 (and any other users), thus maintaining a confidence of the generated master key.

In additional aspects, system 140 may be configured to generate and maintain a private crypto key on behalf of user 110 (and additionally or alternatively, user 108 and 112), which system 140 may leverage to encrypt the stored event trigger list, and which may be provided to user 110 (and/or to user 108 and 112) through secure, non-accessible and/or out-of-band communications. Further, and as described above, system 140 may store copies of the private crypto keys in a portion of data repository 144.

Further, in additional embodiments, one or more computing components of system 140 (e.g., server 140) may be configured to hash the generated (and encrypted) rules engine and event trigger list into a genesis block associated with the hybrid public-private ledger. In other aspects, system 140 may provide the encrypted rules engine and event triggers list to one or more of peer system 160, which may be configured to hash the encrypted rules engine and event trigger list into the genesis block. By way of example, and by hashing the encrypted rules engine and event trigger list into the genesis block of the hybrid public-private ledger, the disclosed embodiments enable an in-band communication of the encrypted rules engine and event triggers from user to user within blocks (e.g., transactions) of the hybrid public-private ledger Exemplary Data Repositories and Stored Data Data repository 144 may include one or more memories that are configured to store and provide access to data and/or software instructions. Such memories may include tangible non-transitory computer-readable media that store software instructions that, when executed by one or more processors (e.g., of server 132), perform one or more operations consistent with disclosed embodiments. Data repository 144 may also be configured to store information relating to business entity 150, e.g., a financial institution.

For instance, data repository 144 may store customer data that uniquely identifies customers of a financial institution associated with system 140. By way of example, a customer of the financial institution (e.g., user 107) may access a web page associated with system 140 (e.g., through a web server executed by a corresponding front end), and may register for digital banking services and provide data, which may be linked to corresponding user 107 and stored as customer data within data repository 144. The stored customer data may, for example, include personal information, government-issued identifiers, employment information, and contact information. The stored customer data may also include authentication credentials associated with registered users of the financial institution (e.g., a user name, a user-specified password, a system-generated password, an alphanumeric identification number (e.g., a PIN number) specified by the users or assigned by financial system 140, biometric information, and information facilitating enhanced authentication techniques).

In additional aspects, and as described above, data repository 144 may store a rules engine identifying or more rules that regulate a distribution of the tracked assets, an initiation of one or more transactions involving the tracked assets (e.g., a sale, a transfer in ownership, a use of the tracked assets as collateral in a secured transaction etc.), and further, any additional or alternate action involving the tracked assets and/or the hybrid public-private ledger (e.g., processes that generate additional cryptographic key sets for users 107, 108, 110, and/or 112, processes that recover assets racked in the hybrid public-private ledger, etc.). Further, and as described above, data repository 144 may also store information identifying an event triggers list that identifies causal relationships established by system 140 between one or more of the established rules and one or more events that trigger an initiation of one or more corresponding regulated distributions, transactions, and/or assets tracked within the hybrid block-chain ledger (e.g., "triggering events").

In some aspects, system 140 may be configured to establish one or more of the rules, and further, one or more of the causal relationships and triggering events, based on one or more internal regulations associated with business entity 150. In other aspects, system 140 may one or more of the rules and/or triggering events based on information received from one or more of users 107, 108, 110, and/or 112 (e.g., as input provided to a web page or other graphical user interface (GUI) presented by client devices 101, 102, 104, and/or 106 and provided to system 140).

In an embodiment, data repository 144 may also store a copy of a master key and private crypto keys associated with users 107, 108, 110, and 112 (and additionally or alternatively, additional private crypto keys associated with other users). By way of example, system 140 may be configured to store the private crypto keys in a data structure that includes information that associates the private crypto keys with corresponding ones of user 107, 108, 110, and 112, and further, may be configured to store the master key in a data structure within data repository 144 that is inaccessible to users 107, 108, 110, and/or 112 (and additionally or alternatively, to other users). Further, in some aspects, data repository 144 may be configured to store the rules engine and/or event triggers list in raw, unencrypted form. In other aspects, consistent with the disclosed embodiments, data repository 144 may be configured to store the rules engine and/or event triggers in encrypted form (e.g., using the stored master key), and/or store a hashed representation of the rules engine and/or the event triggers list.

Exemplary Communications Networks

Communications network 120 may include one or more communication networks or medium of digital data communication. Examples of communication network 120 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. Consistent with embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

Exemplary Peer Systems

Referring back to FIG. 1, peer systems 160 may include one or more computing systems configured to execute software instructions to perform one or more operations consistent with disclosed embodiments. In some aspects, peer systems 160 may include computing components configured to store, maintain, and generate data and software instructions. For example, each of peer systems 160 may include one or more computing devices (e.g., a server, network computer, or mainframe computer) having one or more processors that may be selectively activated or reconfigured by executable instructions (e.g., computer programs) stored in one or more tangible, non-transitory computer-readable storage devices.

In an embodiment, one or more of peer system 160 may be configured to receive, from client device 104 across network 120, information associated with a distribution of, transaction involving, or other action associated with one or more assets tracked within hybrid block-chain ledgers consistent with the disclosed embodiments. By way of example, the received information may include, but is not limited to, data identifying at least a portion of the tracked assets, data identifying a current owner of the portion of the tracked assets (e.g., user 110) (or a obfuscated owner identifier), and further, encrypted copies of and/or hash values representative of the rules engine and event triggers list.

In some aspects, the one or more of peer systems 160 may be configured (e.g., by the executed software programs) to validate the received information and to generate a new block of the hybrid block-chain ledger that includes the received information, either alone (e.g., using a "one transaction, one block" paradigm) or in combination with information identifying additional distributions, transactions, or other actions associated with one or more tracked assets (e.g., as a multiple-transaction block). The one or more of peer systems 160 may be further configured to generate one or more hashes representative of the new block, which may be appended to a prior version of the hybrid private-public ledger along with the newly generated block. In some aspects, the one or more of peer system 160 may maintain the updated versions of the hybrid private-public ledger (i.e., the latest, longest hybrid private-public ledger), and may provide the updated version of the hybrid private-public ledger to client devices 101, 102, 104, and/or 106 (and additionally or alternatively, other client devices associated with other users) upon receipt of a request across network 120 and/or at regular or predetermined intervals. In some aspects, one or more of peer systems 140.

In certain instances, and in addition to a connection with network 120, peer systems 160 may be interconnected across a peer-to-peer network (not depicted in FIG. 1) using any of the wired or wireless communications protocols outlined above. Further, in some instances, one or more of peer systems 160 may function as a "miner," where any miner may be compensated in units of a virtual currency (e.g., Bitcoin™) for validating the received data and for generating updated versions of the hybrid block-chain ledger.

Exemplary Processes for Tracking Assets using Hybrid Block-Chain Ledgers

In some embodiments, client devices 101, 102, 104, and/or 106 may execute one or more stored applications that enable corresponding users to track, in conjunction with peer systems 150 and other components of system 100, a disposition and distribution of one or more assets using conventional, publicly available and transparent block-chain ledgers. In some aspects, the use of public block-chain ledgers to track ownership, disposition, and distribution of actual and/or virtual assets (e.g., unit of virtual currencies, such as Bitcoin™, unit of other financial instruments and securities, physical assets, etc.) may present advantages over existing centralized server systems, such as those provided by financial institutions that leverage private ledgers.

Asset Tracking using Conventional Block-Chain Ledgers

Figure 2:
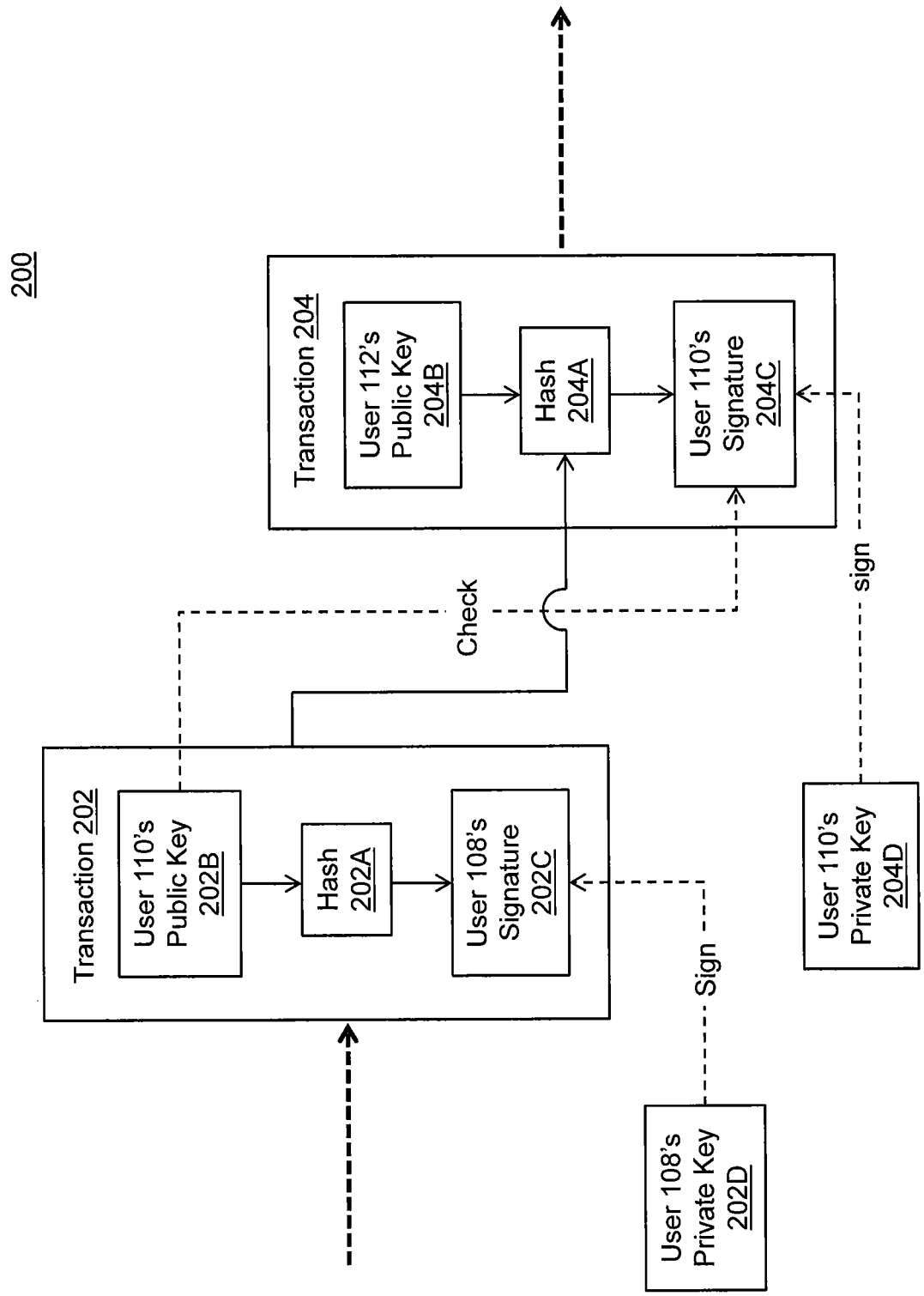
FIG. 2 is a schematic diagram of a conventional block-chain ledger architecture.

FIG. 2 is a schematic diagram of an exemplary structure 200 of a conventional block-chain ledger, which may be generated through the interaction of components of system 100. For example, as described in reference to FIG. 2, a user (e.g., user 110) may be associated with a device (e.g., client device 104) that executes a stored software application (e.g., a wallet application) capable of obtaining a current version of a conventional block-chain ledger from one or more networked computer systems (e.g., one of peer systems 160 configured to "mine" broadcasted transaction data and update ledgers). In some aspects, the current version of a conventional block-chain ledger may represent a "longest" block-chain ledger than includes a maximum number of discrete "blocks," which may identify transactions that transfer, distribute, etc., portions of tracked assets among various owners, including user 110.

For example, client device 104 may obtain the current block-chain ledger, and may process the block chain ledger to determine that a prior owner (e.g., user 108) transferred ownership of a portion of the tracked assets to user 110 in a corresponding transaction (e.g., transaction 202, schematically illustrated in FIG. 2). As described above, one or more of peer systems 160 may have previously data verified, processed, and packed associated with transaction 202 may be into a corresponding block of the conventional block-chain using any of the exemplary techniques described above and/or apparent to one of ordinary skill in the art.

In some aspects, as illustrated in FIG. 2, transaction 202 may include input data that references one or more prior transactions (e.g., transactions that transferred ownership of the tracked asset portion to user 108), and further, output data that includes instructions for transferring the tracked asset portion to one or more additional owners (e.g., user 110). For example, input data consistent with the disclosed embodiments may include, but is not limited to, a cryptographic hash of the one or more prior transactions (e.g., hash 202A) and the set of rules and triggers associated with the assets while the output data consistent with the disclosed embodiments may include, but is not limited to, a quantity or number of units of the tracked asset portion that are subject to transfer in transaction 202 and a public key of the recipient (e.g., public key 202B of user 110).

Further, in some aspects, the transaction data may include a digital signature 202C of user 108 (e.g., the prior owner), which may be applied to hash 202A and public key 202B using a private key 202D of user 108 through any of a number of techniques apparent to one of skill in the art and appropriate to the conventional block-chain ledger architecture. By way of example, the presence of user 108's public key within transaction data included within the conventional block-chain ledger may enable client device 104 and/or peer systems 160 to verify user 108's digital signature, as applied to data associated with transaction 202.

In an embodiment, user 110 may elect to further transfer the tracked asset portion to an additional user (e.g., user 112). For example, as described above, client device 104 may execute one or more software applications (e.g., wallet applications) that generate input and output data specifying a transaction (e.g., transaction 204 of FIG. 2) that transfers ownership of the tracked asset portion from user 110 to user 112, and further, that transmit the generated data to one or more of peer systems 160 for verification, processing (e.g., additional cryptographic hashing) and inclusion into a new block of the clock-chain ledger.

For example, data specifying transaction 204 may include, but is not limited to, a cryptographic hash 204A of prior transaction 202, a quantity or number of units of the tracked asset portion that are subject to transfer in transaction 204, and a public key of the recipient (e.g., public key 204B of user 112). Further, in some aspects, the data specifying transaction 204 may include a digital signature 204C of the user 110, which may be applied to hash 204A and public key 204B using a private key 204D of user 110 using any of the exemplary techniques described above. Further, and by way of example, the presence of user 110's public key 202B within transaction data included within the conventional block-chain ledger may enable various devices and systems (e.g., client devices 101, 102, 104, and/or 106, peer systems 160, etc.) to verify user 110's digital signature 204C, as applied to data specifying transaction 204.

As described above, one or more of peer systems 160 may receive the data specifying transaction 204 from client device 104. In certain instances, peer systems 160 may act as "miners" for the block-chain ledger, and may competitively process the received transaction data (either alone or in conjunction with other data) to generate additional blocks of the ledger, which may be appended to the block-chain ledger and distributed across peer systems 160 (e.g., through a peer-to-peer network) and to other connected devices of system 100.

In some aspects, conventional block-chain ledger architectures described above may enable the public to review content of the ledgers and verify ownerships. Further, the decentralized nature of conventional block-chain ledgers may also enable multiple distributed networks to verify the contents of a single ledger. The resulting redundancy may render conventional block-chain ledger architecture more robust than centralized server systems, and effectively eliminate the falsification of ledger data by malicious parties.

Despite these advantages, conventional block-chain ledger architectures may exhibit significant flaws when implemented by secured, high-risk systems. By way of example, unencrypted conventional ledger blocks may represent a security concern for transactions of sensitive nature, and further, may represent a privacy concern for members of the general public. For instance, information indicative of an interaction of a prior asset owner and a corresponding device, as present within conventional block-chain ledgers, may represent private information that should not be available to future owners, let alone members of the public.

Further, if an owner were to lose or misplace a corresponding private key, the distributed nature of conventional block-chain ledger architectures, such as those described above, provide little recourse to recover possession of the one or more tracked assets. In certain aspects, the rigidity and inflexibility of these conventional block-chain ledger architectures, and their inability to adapt to changing circumstances (e.g., loss of private keys, theft of tracked assets due to fraudulent or malicious activity), often results in volatility in the usage of the tracked assets and an erosion in a public trust of conventional block-chain ledgers.

Thus, there is a need for improved systems and methods that not only enhance the security of block-chain ledger architectures for use high-risk, sensitive applications, but that also provide a framework that provides owners or holders of assets tracked by block-chain ledger architectures with recourse in an event of fraud or malicious activity, while maintaining the public availability and verification characteristic of block-chain ledgers.

Exemplary Hybrid Public-Private Block-Chain Ledger Architectures

The disclosed embodiments address these and other problems associated with conventional block-ledger architectures in a technical manner, by providing computer-implemented systems and methods that augment a conventional block-chain ledger with a private-master encryption key architecture that, in conjunction with an owner's pair of public and private block-chain keys, selectively encrypt ledger data to protect both a privacy of owners of tracked assets and a confidentiality of existing instruction sets maintained within the block-chain ledger.

Further, by incorporating an encrypted rules engine and corresponding list of triggering events (e.g., an event triggers list) into each block of the conventional block-chain ledger architecture (and thus generating a hybrid, public-private block-chain architecture), computer-implemented systems and methods consistent with the disclosed embodiments may perform operations that provide owners or holders tracked assets with recovery options in an event of fraud or malicious activity, while maintaining the public availability and verification characteristic of conventional block-chain ledgers.

In certain aspects, discrete data blocks of the conventional block-chain ledgers (e.g., as outlined above in reference to FIG. 2) and of the hybrid block-chain ledgers (e.g., as described in reference to FIG. 3) may include common elements of data that may specify transactions that distribute, transfer, and/or otherwise act upon portions of tracked assets. For example, these common data elements may include, but are not limited to, input data that references one or more prior transactions (e.g., a cryptographic hash of the one or more prior transactions), output data that includes instructions for transferring the tracked asset portion to one or more additional owners (e.g., a quantity or number of units of the tracked asset portion that are subject to the transaction and a public key of the recipient) and further, a digital signature applied to the input and/or output data using a corresponding public key of a current owner of the tracked asset portion. The disclosed embodiments are, however, not limited to exemplary transactions that include a transfer of tracked assets and to the exemplary data elements described above, and in further embodiments, discrete blocks of the hybrid block-chain legers may represent any additional or alternate transaction appropriate to the tracked assets, and further, any additional or alternate data appropriate to the tracked assets and to the transaction.

In contrast to the conventional block-chain ledgers described above, the disclosed embodiments may establish a "centralized authority" capable of vetting real-time transactions (e.g., distributions, transfers, and/or other actions) involving portions of assets tracked within the exemplary hybrid block-chain ledger architectures described herein, and further, of establishing and maintaining rules (e.g., through a rules engine and corresponding list of triggering events) that facilitate regulatory-based, policy-based, and customer-specified controls of transactions involving the tracked assets (e.g., units of virtual currency, etc.).

For example, and as described above, business entity 150 may represent the centralized authority, and one or more computing components of system 150 may perform operations that establish the rules engine and the list of triggering events, which may be stored within a secure data repository (e.g., data repository 144). In some aspects, the generated and stored rules engine may identify or more rules that regulate a distribution of the tracked assets, an initiation of one or more transactions involving the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets racked in the hybrid public-private ledger, etc.). Further, and as described above, the generated and stored list of triggering events may include information that specifies causal relationships between one or more of the established rules and one or more events that trigger an initiation of one or more corresponding regulated distributions, transactions, and/or actions associated with assets tracked within the hybrid public-private ledger (e.g., the triggering events).

In some aspects, system 140 may establish one or more of the rules and/or triggering events to reflect regulations and/or policies promulgated by governmental entity, a financial regulator, and/or the centralized authority. For example, system 140 may establish a loss of a private key by user 110 as a "triggering event" that would cause system 140 to perform operations that create a new transaction and generate a new pair of public and private block-chain keys for user 110 in response to a verification of particular authentication credentials. In other aspects, system 140 may establish one or more of the rules and/or triggering events based on information received from user 110 (e.g., as input provided to a web page or other graphical user interface (GUI) presented by client device 104 and provided to system 140). For example, user 110 may specify a particular distribution of tracked assets (e.g., recurring bill payments, distributions to other owners, etc.) in response to an accident involving user 110 and/or user 110's death (e.g., triggering events).

In further contrast to the conventional block-chain ledgers described above, one or more computing components of system 140 (e.g., server 142 upon execution of stored instructions) may generate additional cryptographic keys that facilitate the exemplary regulation of transactions (e.g., distributions, transfers, and/or actions) involving assets tracked within the hybrid public-private ledger. By way of example, system 140 may generate a master cryptographic key with which system 140 may encrypt the generated and stored rules engine. In some aspects, certain aspects, system 140 may store copies of the generated master key in a portion of data repository 144 that is not accessible to user 110 (and any other users), thus maintaining a confidence of the generated master key.

System 140 may also perform operations that encrypt the generated list of triggering events, either alone or in conjunction with metadata identifying the centralized authority and/or information facilitating a processing of the transaction blocks throughout the hybrid block-chain ledger. In certain aspects, system 140 may also perform operations that generate and maintain additional private cryptographic keys (e.g., a private "crypto" key) associated with each owner associated with the assets tracked within the hybrid block-chain ledger (e.g., users 107, 108, 110, and/or 112) and further, that would enable the owners to decrypt and access the list of triggering events and additionally or alternatively, the metadata identifying the centralized authority. System 140 may store copies of the generated private crypto keys in a portion of data repository 144. Furthermore, system 140 may also perform operations that provide corresponding ones of the private crypto keys to users 108, 110, and/or 112 through secure, non-accessible and/or out-of-band communications.

The disclosed embodiments may also be configured to communicate the encrypted and/or hashed rules engine and list of triggering events to owners of and/or user associated with the tracked assets through "in-band" communication processes, such as through an incorporation of the encrypted rules engine and list of triggering events into the transaction blocks of the hybrid block-chain ledger. For example, system 140 may perform operations that hash the encrypted rules engine and list of triggering events into a genesis block of the hybrid block-chain ledger, the contents of which may be incorporated (e.g., by client devices 101, 102, 104, and/or 106, peer systems 160, etc.) into each of the subsequent transaction blocks generated and appended to the hybrid block-chain ledger. In some aspects, by incorporating the hashed and encrypted rules engine and list of triggering events into blocks of the hybrid block-chain ledger, the disclosed embodiments may ensure that the established rules are followed even in an event of actions by malicious parties to disrupt the tracked assets (e.g., instances of Bitcoin™ peeling, etc.)

Further, in some instances, the additional private crypto keys held by the owners and/or users (e.g., stored in corresponding ones of client devices 101, 102, 104, and/or 106 and accessible to executable application programs) may enable the owners and/or users to access the encrypted list of triggering events maintained within the hybrid block-chain ledger. The owners and/or user may, through corresponding client devices, view the individual events that, when detected by system 140, could cause system 140 to perform operations that recover, authorize, audit, and/or verify the transaction and/or ownership data included within the hybrid block-chain ledger (e.g., associated with corresponding portions of the tracked assets).

In certain aspects, one or more computing components of system 140 may perform operations that modify portions of the stored rules and/or list of triggering events, e.g., in response to changes in regulations and/or policies, in response to additional owner input, etc. In order to access and modify the generated rules engine (and/or the list of triggering events) maintained within the hybrid block-chain ledger, system 140 may leverage the stored master cryptographic key to access and modify the hashed and encrypted rules engine. System 140 may, in certain instances, encrypt and re-hash the modified rules engine and submit the encrypted and hashed modified rules engine to one or more of peer systems 160 for inclusion in a block of the hybrid block-chain ledger. For example, the one or more of peer systems 160 may incorporate the hashed and encrypted modified rules engine into the hybrid block-chain ledger as a special transaction (e.g., a "0" value transaction), such that the hybrid block-chain ledger tracks each change within the modified rules engine.

Figure 3:
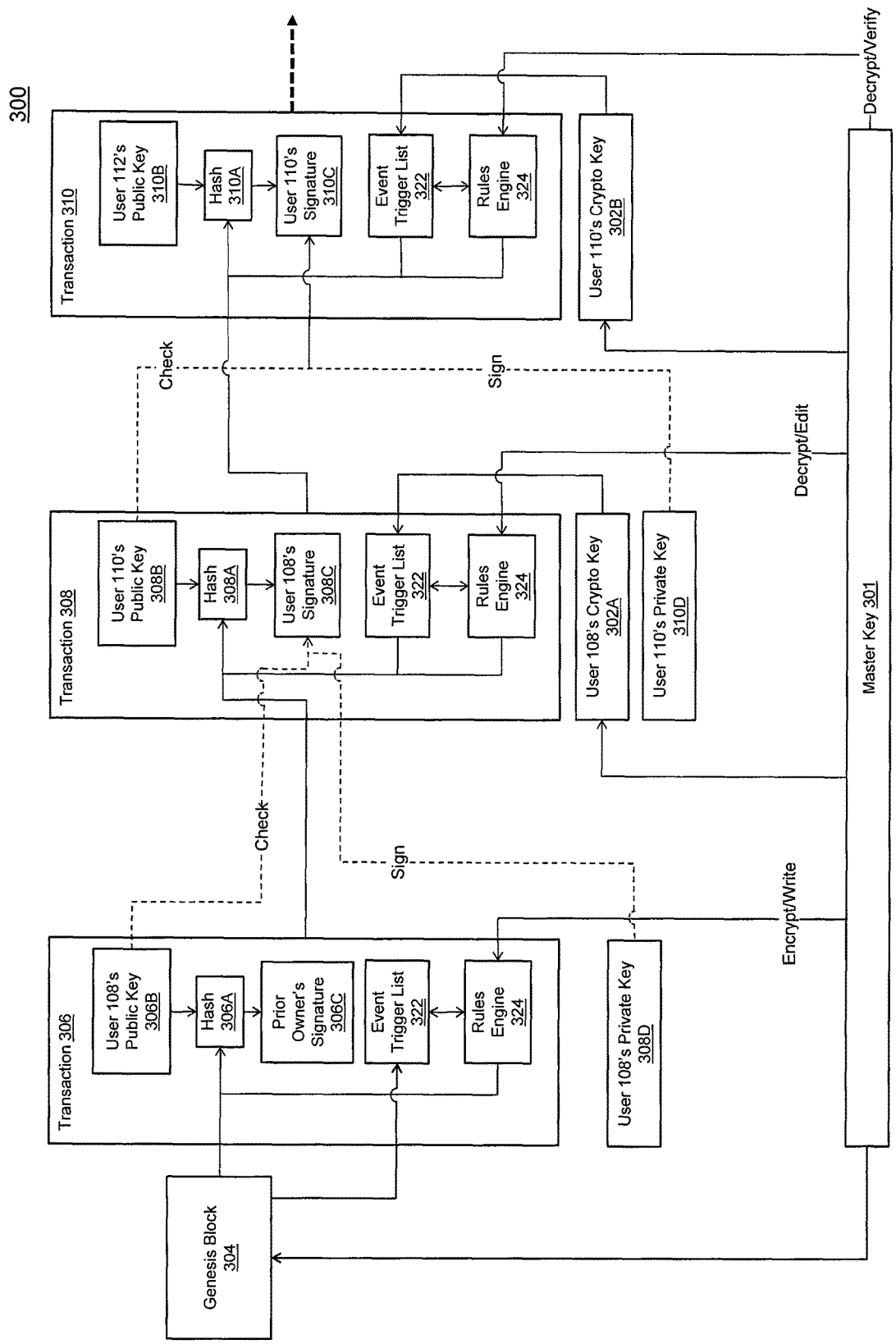
FIG. 3 is a schematic diagram of a hybrid, public-private block-chain ledger architecture in accordance with some embodiments of the present disclosure.

FIG. 3 is a schematic diagram of illustrating an exemplary structure 300 of a hybrid, public-private block-chain ledger, which may be generated through the interaction of components of system 100, in accordance with the disclosed embodiments. For example, as described in reference to FIG. 3, users 108, 110, and 112 may be associated with corresponding devices (e.g., client devices 102, 104, and 106), which may be configured to execute one or more stored software applications (e.g., a wallet application) capable of obtaining a current version of a hybrid block-chain ledger from one or more networked computer systems (e.g., one of peer systems 160 configured to "mine" broadcast transactions and update ledgers).

Further, in some aspects, and as described above, a system associated with a centralized authority (e.g., system 140 associated with business entity 150) may generate a rules engine that regulate transactions involving the assets tracked by the hybrid block-chain ledger (e.g., distributions, transfers of ownership, other actions, etc.), and further, a list of triggering events that, upon detection by system 140, trigger an initiation of one or more of the distributions, transfers, and/or other actions regulated by the generated rules engine. In additional aspects, and as described above, system 140 may generate a master encryption key (e.g., master key 301 of FIG. 3), which may be system 140 may maintain in a portion data repository 144, and may generate additional private "crypto" keys 302A and 302B, which may be associated with corresponding ones of users 108 and 110 In some aspects, system 140 may maintain private crypto keys 302A, 302B, and 302C in a portion of data repository 144 and provide private crypto keys 302A, 302B, and 302C to users 108, 110, and 112 through secure, out-of-band communications. System 140 may, in additional aspects, encrypt the generated rules engine and the generated list of triggering events, and further, perform operations that hash the encrypted rules engine and list of triggering events into a genesis block of the hybrid block-chain ledger (e.g., genesis block 304).

In an embodiment, one of the users (e.g., user 108) may own and/or control a portion of the tracked assets. For example, a device associated with user 108 (e.g., client device 102) may execute a stored software application (e.g., a wallet application) capable of obtaining a current version of a hybrid block-chain ledger, including genesis block 304, from one or more networked computer systems (e.g., one of peer systems 160 configured to "mine" broadcast transactions and update ledgers). In some aspects, the current version of a hybrid block-chain ledger may represent a "longest" block-chain ledger than includes a maximum number of discrete "blocks," which may identify transactions that transfer, distribute, etc., portions of tracked assets among various owners, including user 108.

For example, client device 102 may obtain the current hybrid block-chain ledger, and may process the hybrid block-chain ledger to determine that a prior owner transferred ownership of a portion of the tracked assets to user 108 in a corresponding transaction (e.g., transaction 306, schematically illustrated in FIG. 3). As described above, one or more of peer systems 160 may have previously data verified, processed, and packed data associated with transaction 306, which may be into a corresponding block of the conventional block-chain using any of the exemplary techniques described above and/or apparent to one of ordinary skill in the art.

In some aspects, as illustrated in FIG. 3, data specifying transaction 306 may include input data that references one or more prior transactions (e.g., transactions that transferred ownership of the tracked asset portion to the prior owner), and further, output data that includes instructions for transferring the tracked asset portion to user 108. For example, and as described above, input data consistent with the disclosed embodiments may include, but is not limited to, a cryptographic hash of the one or more prior transactions (e.g., hash 306A), and output data consistent with the disclosed embodiments may include, but is not limited to, a quantity or number of units of the tracked asset portion that are subject to transfer in transaction 302 and a public key 306B of user 108 (i.e., the recipient of the tracked asset portion transferred in transaction 306). Further, in some aspects, the transaction data may include a digital signature 306C of the prior owner, which may be applied to hash 306A and public key 306B using a private key of the prior owner through any of a number of techniques apparent to one of skill in the art and appropriate to the conventional block-chain ledger architecture.

Further, and in contrast to the conventional block-chain ledger architectures described above, transaction 306 may also include encrypted and/or hashed copies of rules engine 320 and trigger event list 322. In certain aspects, a device of the prior owner (e.g., which may execute one or more software applications) may access genesis block 304 (e.g., from the current version of the hybrid block-chain ledger obtained from one or more of peer systems 160), may parse genesis block 306, and may extract copies of the encrypted and/or hashed rules engine 322 and trigger event list 324. The prior owner's device may transmit to one or more of peer systems 160 along with the hash 306A, public key 306B, and digital signature 306C for verification, processing (e.g., additional cryptographic hashing) and inclusion into a new block of the hybrid block-chain ledger.

In an embodiment, user 108 may elect to further transfer that tracked asset portion to an additional user (e.g., user 110). For example, as described above, the one or more software applications executed by client device 102 may cause client device 102 to perform operations that generate input and output data specifying a new transaction (e.g., transaction 308 of FIG. 3) that transfers ownership of the tracked asset portion from user 108 to user 110, and further, that transmit the generated data to one or more of peer systems 160 for verification, processing (e.g., additional cryptographic hashing) and inclusion into a new block of the hybrid block-chain ledger.

For example, data specifying transaction 308 may include, but is not limited to, a cryptographic hash 308A of prior transaction 306, a quantity or number of units of the tracked asset portion that are subject to transfer in transaction 308, and a public key of the recipient (e.g., public key 308B of user 110). Further, in some aspects, the data specifying transaction 308 may include a digital signature 308C of the user 108, which may be applied to hash 308A and public key 308B using a private key 308D of user 108 using any of the exemplary techniques described above. Further, and by way of example, the presence of user 108's public key within transaction data included within the conventional block-chain ledger may enable various devices and systems (e.g., client devices 102, 104, and/or 106, peer systems 160, etc.) to verify the user 108's digital signature 308D, as applied to data specifying transaction 308.

Additionally, and as described above, client device 102 may also parse data specifying prior transaction 306 (e.g., as obtained from the current version of the hybrid block-chain ledger) and extract encrypted and/or hashed copies of rules engine 322 and trigger event list 324. In certain aspects, client device 102 may append the encrypted and/or hashed copies of rules engine 322 and trigger event list 324 to the data specifying transaction 308 (e.g., cryptographic hash 308A, public key 308B, and digital signature 308C), and transmit the data specifying transaction 308B to one or more of peer systems 160 for verification, processing (e.g., additional cryptographic hashing) and inclusion into a new block of the hybrid block-chain ledger.

Further, and as described above, private crypto key 302A may enable client device 102 (e.g., associated with user 108) to access encrypted event trigger list 322 upon extracted from the hybrid block-chain ledger, as described above. In some embodiments, private crypto key 302A may provide client device 102 with read-only access to the encrypted event trigger list 322. In some aspects, client device 102 may obtain private crypto key 302A from system 140 using secured out-of-band communications, and additionally or alternatively, as input provided by user 108 through a web page or other graphical user interface (GUI) presented by client device 104.

In an embodiment, ownership of the tracked asset portion may be transferred from user 108 to user 110 upon verification and publication of the data specifying transaction 308 within a corresponding block of the hybrid block-chain ledger by peer systems 160. In further embodiments, and as described above, user 110 may elect to further transfer that tracked asset portion to yet another user (e.g., user 112). For example, as described above, the one or more software applications executed by client device 104 may cause client device 104 to perform operations that generate input and output data specifying a new transaction (e.g., transaction 310 of FIG. 3) that transfers ownership of the tracked asset portion from user 110 to user 112, and further, that transmit the generated data to one or more of peer systems 160 for verification, processing (e.g., additional cryptographic hashing) and inclusion into a new block of the hybrid block-chain ledger.

For example, data specifying transaction 310 may include, but is not limited to, a cryptographic hash 310A of prior transaction 308, a quantity or number of units of the tracked asset portion that are subject to transfer in transaction 310, and a public key 310B of user 112. Further, in some aspects, the data specifying transaction 310 may include a digital signature 310C of the user 110, which may be applied to hash 310A and public key 310B using a private key 310D of user 110, as described above. Additionally, and by way of example, the presence of user 110's public key 308B within transaction data included within the hybrid block-chain ledger may enable various devices and systems (e.g., client devices 102, 104, and/or 106, peer systems 160, etc.) to verify the user 110's digital signature 310C, as applied to data specifying transaction 310.

Additionally, and as described above, client device 104 may also parse data specifying prior transaction 308 (e.g., as obtained from the current version of the hybrid block-chain ledger) and extract encrypted and/or hashed copies of rules engine 322 and trigger event list 324. In certain aspects, client device 104 may append the encrypted and/or hashed copies of rules engine 322 and trigger event list 324 to the data specifying transaction 310 (e.g., cryptographic hash 310A, public key 310B, and digital signature 310C), and transmit the data specifying transaction 310 to one or more of peer systems 160 for verification, processing (e.g., additional cryptographic hashing) and inclusion into a new block of the hybrid block-chain ledger. In an embodiment, ownership of the tracked asset portion may be transferred from user 110 to user 112 upon verification and publication of the data specifying transaction 310 within a corresponding block of the hybrid block-chain ledger by peer systems 160.

Further, and as described above, private crypto key 302B may enable client device 104 (e.g., associated with user 110) to decrypt event trigger list 322 upon extraction from the hybrid block-chain ledger, as described above. In some aspects, client device 104 may obtain private crypto key 302B from system 140 using secured out-of-band communications, and additionally or alternatively, as input provided by user 110 through a web page or other graphical user interface (GUI) presented by client device 104. In other aspects, client device 104 may identify and extract private crypto key 302B from a portion of the hybrid block-chain ledger obtained from peer systems 160 (e.g., as a secure in-band communication).

In the embodiments described above, system 140 may establish and maintain rules (e.g., through a rules engine and corresponding list of triggering events) that facilitate regulatory-based, policy-based, and customer-specified controls of transactions involving assets tracked within a hybrid block-chain ledger. For example, client devices 102, 104, and/or 106 may generate transaction data that includes and rules engine and list of triggering events, and one or more of peer systems 160 may embed the generated transaction data into blocks of the hybrid block-chain ledger for reference in subsequent transactions. Further, in certain aspects, system 140 may be configured to detect an occurrence of an event (e.g., based on data received from client devices 102, 104, and/or 106, etc.), may determine whether the list of triggering events includes the detected event, and when triggering event list includes the detected event, perform one or more operations consistent with an established rule that references the detected event, as described below in reference to FIG. 4.

Figure 4:
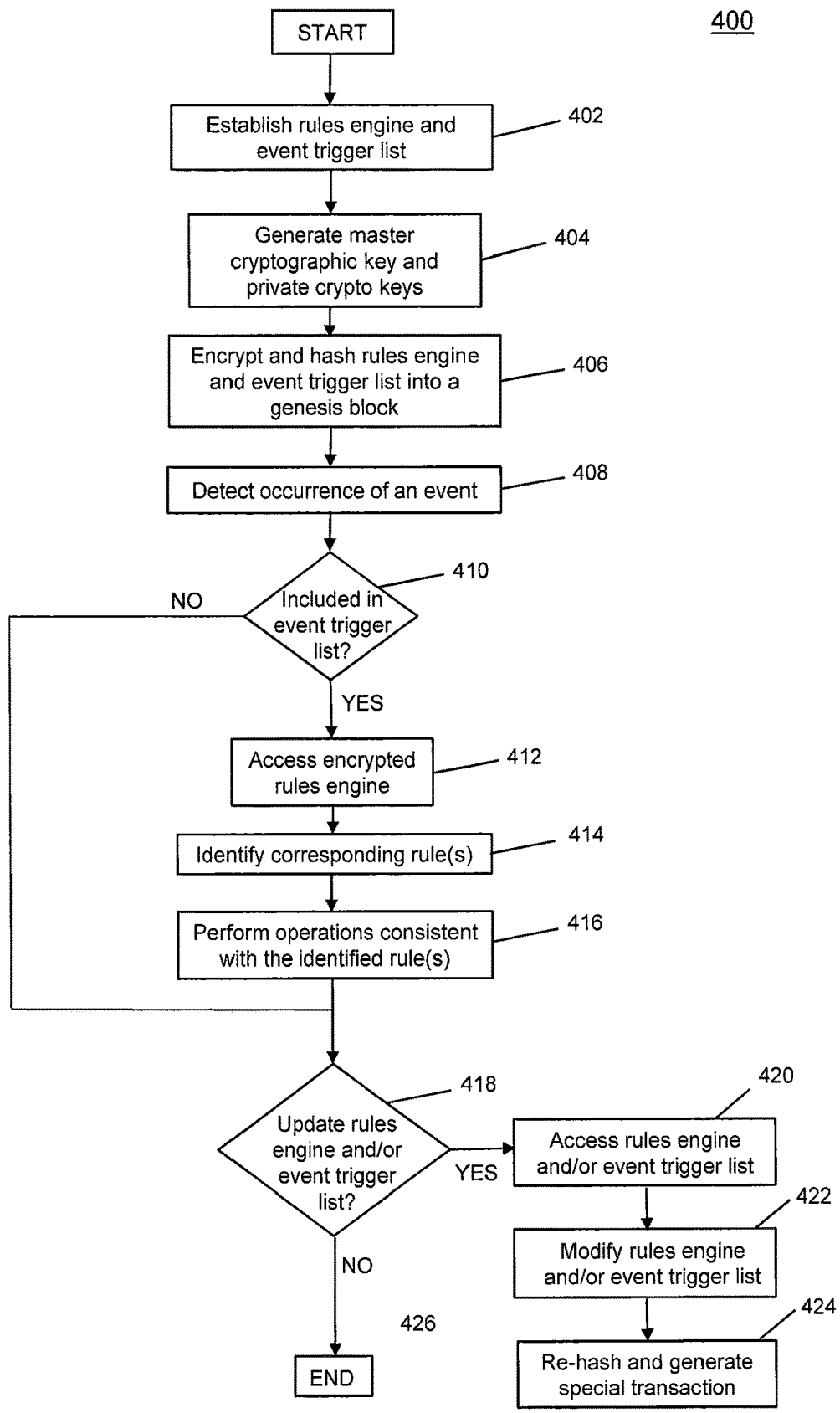
FIG. 4 is a flowchart of an exemplary process for performing operations in response to events tracked within a hybrid block-chain ledger in accordance with some embodiments of the present disclosure.

FIG. 4 is a flowchart of an exemplary process 400 for automatically performing event-based operations on assets tracked within a hybrid block-chain ledger in accordance with disclosed embodiments. In an embodiment, a centralized authority may be assigned to establish regulatory-based, policy-based, and customer-specified control over assets tracked within the hybrid block-chain ledger. In some aspects, tracked assets consistent with the disclosed embodiments may include, but are not limited to, units of a virtual currency or a crypto-currency, units of financial instruments held by one or more owners, and physical assets utilized by one or more individuals and/or entities. In some aspects, a computer system associated with the centralized authority (e.g., system 140 associated with business entity 150) may execute one more stored application programs to cause system 140 to recover, authorize, audit, and/or verify an ownership of at least a portion of the tracked assets and/or transactions involving he tracked assets based on established and maintained rules.

In one aspect, one or more computing components of system 140 may generate a rules engine and a list of triggering events, which may be stored within a portion of data repository 144 (e.g., in step 402). For example, the generated and stored rules engine may identify or more rules that regulate a distribution of the tracked assets, an initiation of one or more transactions involving the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets tracked in the hybrid public-private ledger, etc.). Further, and as described above, the generated and stored list of triggering events may include information that specifies causal relationships between one or more of the established rules and one or more events that trigger an initiation of one or more corresponding regulated distributions, transfers, and/or actions involving assets tracked within the hybrid public-private ledger (e.g., the triggering events).

In certain instances, system 140 may establish, in step 402, one or more of the rules and/or triggering events to reflect regulations and/or policies promulgated by governmental entity, a financial regulator, and/or the centralized authority. For example, system 140 may establish a loss of a private key by user 110 as a "triggering event" that would cause system 140 to perform operations that generate a new pair of public and private block-chain keys for user 110 in response to a verification of particular authentication credentials. Further, and by way of example, system 140 may deem a documented theft of a portion of the tracked assets a "triggering event" that would cause system 140 to perform operations recover the stolen portion of the tracked assets and generate a new pair of public and private block-chain keys for user 110.

In other instances, system 140 may establish, in step 402, one or more of the rules and/or triggering events based on information received from user 110 (e.g., as input provided to a web page or other graphical user interface (GUI) presented by client device 104 and provided to system 140). For example, user 110 may specify a particular distribution of tracked assets (e.g., recurring bill payments, etc.) in response to an accident involving user 110 and/or user 110's death (e.g., triggering events). The disclosed embodiments are, however, not limited to these exemplary triggering events and corresponding rules, and in further embodiments, system 140 may establish any additional or alternate rules and/or triggering events appropriate to the tracked assets, to business entity 150, and further, to users 108, 110, and 112.

Further, one or more computing components of system 140 may generate additional cryptographic keys that facilitate the exemplary regulation of transactions (e.g., distributions, transfers, and/or actions) involving assets tracked within the hybrid public-private ledger (e.g., in step 404). By way of example, in step 404, system 140 may generate a master cryptographic key with which system 140 may encrypt the generated and stored rules engine, as described above. In some aspects, certain aspects, system 140 may store copies of the generated master key in a portion of data repository 144 that is not accessible to user 110 (and any other users), thus maintaining a confidence of the generated master key.

Further, in step 404, system 140 may also perform operations that generate and maintain additional private cryptographic keys (e.g., private "crypto" keys) associated with each owner of the assets tracked within the hybrid block-chain ledger. As described above, the generated private crypto keys may enable a device of each of owner to decrypt and access the list of triggering events and additionally or alternatively, metadata identifying the centralized authority. System 140 may store copies of the generated private crypto keys in a portion of data repository 144. Furthermore, system 140 may also perform operations that provide corresponding ones of the private crypto keys to users 108, 110, and/or 112 through secure, non-accessible and/or out-of-band communications.

In step 406, system 140 may perform operations that encrypt the generated and stored rules engine (e.g., using the master encryption key) and further, that encrypt the generated and stored list of triggering events (e.g., using any of the exemplary techniques described above that facilitate decryption using the private crypto keys). For example, system 140 may perform operations in step 406 that hash the encrypted rules engine and list of triggering events into a genesis block of the hybrid block-chain ledger, the contents of which may be incorporated (e.g., by client devices 102, 104, and/or 106, peer systems 160, etc.) into each of the subsequent transaction blocks generated and appended to the hybrid block-chain ledger. In some aspects, by incorporating the hashed and encrypted rules engine and list of triggering events into the blocks of the hybrid block-chain ledger, the disclosed embodiments may ensure that the established rules are followed even in an event of actions by malicious parties that disrupt the tracked assets (e.g., instances of Bitcoin™ peeling, etc.).

Further, in some embodiments, one or more computing components of system 140 may detect an occurrence of an event involving a portion of the tracked assets, an owner of a portion of the tracked assets, and/or a transaction involving a portion of the detected assets (e.g., in step 408). For example, system 140 may receive data from client device 104 that indicates user 110 lost a corresponding private block-chain key associated with a portion of the tracked assets. In other instances, system 140 may detect an event in step 140 based on data received across network 120 from one or more systems associated with local, state, and/or federal governmental entities (e.g., data from a law enforcement system notifying business entity 150 of a theft of a portion of the tracked assets, data from a local government confirming a death of an owner of a portion of the tracked assets, etc.). Further, in additional instances, system 140 may detect an occurrence of an event based on one or more sensors and devices communicatively connected to network 120 and capable of transmitting data to system 140. The disclosed embodiments are, however, not limited to these exemplary events, and in further embodiments, system 140 may be configured to detect any additional or alternate event appropriate to the tracked assets and to the components of system 100.

System 140 may also be configured to access the stored list of triggering events (e.g., within database 144), and may determine whether the list of triggering events includes the detected event (e.g., in step 410). If system 140 were to identify the detected event within the list of triggering events (e.g., step 410; YES), system 140 may establish the detected event as a triggering event, and may access the encrypted rules engine using the master encryption key (e.g., in step 412). System 140 may further identify, within the accessed rules engine, one or more of the established rules that are causally related to the detected triggering event (e.g., in step 414). Further, in some aspects, system 140 may be configured to perform one or more operations, either individually or in sequence, that are consistent with the identified rules (e.g., in step 416). For example, the accessed rules engine may include information identifying the one or more operations associated with the identified rules. In other instances, at least one of the performed operations may represent a default operation associated with the identified rules (e.g., a specific type of authentication required before performing the one or more operations on behalf of user 110).

In one embodiment, one or more computing components of system 140 may also determine whether to update portions of the generated rules engine and/or list of triggering events (e.g., in step 418). For example, system 140 may identify an update or modification to one or more regulations and/or policies promulgated by governmental entity, a financial regulator, and/or the centralized authority. In other instances, system 140 may obtain, from client device 104, information updating a rule and/or triggering event previously established by system 140 based on input received from user 110 (e.g., through a web page and/or GUI presented by client device 104).

If system 140 determines to update portions of the generated rules engine and/or list of triggering events (e.g., step 418; YES), system 140 may access appropriate portions of the rules engine and/or list or triggering events in step 420 (e.g., using the master encryption key and/or any of the exemplary techniques described above), and may modify the appropriate portions of the rules engine and/or list of triggering events to reflect the updated regulations, policies, user-specified rules, and/or user-specified events (e.g., in step 422). In some instances, system 140 may modify the accessed rules engine by adding a new rule, deleting an existing rule, modifying one or more parameters of an existing rule, and/or modifying one or more operations associated with an existing rule. In other instances, system 140 may modify the accessed list of event triggers to add a new triggering event, delete an existing triggering event, and/or add or modify parameters associated with an existing triggering event.

In some aspects, system 140 may encrypt and re-hash the modified rules engine and/or list of triggering events, and may submit the encrypted and hashed modified rules engine and/or list of triggering events to one or more of peer systems 160 for inclusion in a block of the hybrid block-chain ledger (e.g., in step 424). For example, one or more of peer systems 160 may incorporate the hashed and encrypted modified rules engine and/or list of triggering events into the hybrid block-chain ledger as a special transaction (e.g., a "0" value transaction), such that the hybrid block-chain ledger tracks each change within the modified rules engine and/or list of triggering events. Exemplary process 400 is then complete in step 426.

Referring back to step 418, if system 140 were to determine that no modification to the rules engine and/or the list of triggering events is warranted (e.g., step 418; NO), exemplary process 400 may pass forward to step 426, and exemplary process 400 is complete. Further, and in reference to step 410, if system 140 were to determine that the list of triggering events fails to include the detected event (e.g., step 410; NO), exemplary process 400 may pass forward to step 418, and system 140 may determine whether to update portions of the rules engine and/or list of triggering events using any of the exemplary processes described above.

In the embodiments described above, and through the generation of the master cryptographic key and management of the generated rules engine and corresponding list of triggering events, system 140 may perform operations that recover, authorize, audit, and/or verify an ownership of at least a portion of the tracked assets and/or transactions involving the tracked assets. In certain aspects, the operations performed by system 140, which utilize hybrid block-chain ledgers consistent with the disclosed embodiments, would not be possible using the conventional block-chain ledgers described above.

For example, user 110 may be an avid user of a virtual or crypto-currency (e.g., Bitcoin™), user 110 may store a private key (e.g., private key 310D) on a laptop computer (e.g., client device 104) to generate and confirm Bitcoin™ transactions. In one instance, user 110 may unfortunately drop the laptop into a swimming pool while confirming a Bitcoin™ with private key 310D, and upon retrieved from the swimming pool, user 110 may establish that the laptop no longer functions and that data on the laptop is not recoverable.

Through a device in communication with network 120 (e.g., user 110's smartphone), user 110 may access a conventional block-chain ledger, such as those conventional architectures outlined above, and determine that the Bitcoin™ transfer was incomplete when user 110 dropped the laptop into the swimming pool. Further, user 110 may determine that the Bitcoin™ transaction represents an orphaned block within the conventional block-chain ledger, and the Bitcoins™ associated with the orphaned block are unrecoverable and permanently lost.

In other aspects, user 110 may access a hybrid block-chain ledger (e.g., as described above in reference to FIG. 3), and may determine that the Bitcoin™ transfer was incomplete when user 110 dropped the laptop into the swimming pool. In an embodiment, however, user 110 may provide input to the smartphone identifying the unrecoverable private key, which the smartphone may transmit to system 140 across network 120. In some aspects, system 140 may receive the transmitted message (e.g., in step 408), may determine that user 110's loss of private key 310D represents a triggering event (e.g., step 410; YES), and may perform operations that authenticate user 110's identity and that regenerate a pair of private and public block-chain keys for user 110, which system 140 may transmit to user 110 through any of the secure non-accessible processes outlined above (e.g., in steps 412, 414, and 416). Upon receipt of the newly generated private key, user 110 may access the hybrid block-chain ledger (e.g., through the smartphone) and confirm the Bitcoin™ transfer to recover the crypto-currency.

Further, and by way of example, user 110 may access a wallet application executed by client device 104, and further, may determine that the mobile wallet is missing a number Bitcoins™. User 110 may suspect that the loss of the Bitcoins™ represents a theft by a malicious entity, and through a complex search of a corresponding block-chain ledger (e.g., conventional block-chain ledgers described above, and/or hybrid block-chain ledgers consistent with the disclosed embodiments), user 110 may trace the theft of the Bitcoins™ to a single transaction within a corresponding block. User 110 may contact the police e-crime unit and report the theft, and the police may confirm the accuracy of user 110's allegations regarding the theft.

User 110 may, in some instances, be capable of processing the conventional block-chain ledgers described above to determine an address of the malicious entity responsible for the theft. The decentralized and anonymous nature of conventional block-chain ledgers may, however, prevent user 110 from identifying the malicious entity, and the stolen Bitcoins™ may remain permanently unrecoverable.

The disclosed embodiments may, however, address the deficiencies of conventional block-chain ledgers and provide user 110 with recourse to recover the stolen Bitcoins™. For example, the police e-crime unit may notify the centralized authority of the theft of user 110's Bitcoins™ and destination address associated with the malicious entity (e.g., through a message transmitted to system 140 and received, e.g., in step 408). System 140 may determine that the theft of the Bitcoins™ represents a triggering event included within the generated list (e.g., step 410; YES), and may perform operations that automatically create a request for a new transaction that returns the stolen Bitcoins™ to user 110 using any of the exemplary techniques described above (e.g., in steps 412, 414, and 416). System 140 may also perform operations that regenerate a pair of private and public block-chain keys for user 110, which system 140 may transmit to user 110 through any of the secure non-accessible processes outlined above (e.g., in steps 412, 414, and 416).

The hybrid block-chain ledger architectures described above may add a level of sophistication to conventional mechanisms for trustless communication by allowing transactions involving tracked assets to occur according to common transaction rules. Further, the hybrid block-chain ledger architectures consistent with the disclosed embodiments may allow owners of the tracked assets to project authority over the tracked assets by establishing customized rules for transaction authorization. Furthermore, and in contrast to the conventional techniques described above, the hybrid block-chain ledger architecture may enable a centralized authority (e.g., business entity 150 associated with system 140) to recover, authorize, audit, and/or verify an ownership of at least a portion of the tracked assets and/or transactions involving the tracked assets based on established and maintained rules.

In the embodiments described above, and through the generation of a master cryptographic key and management of a generated rules engine and corresponding list of triggering events, system 140, acting as a centralized authority, may perform operations that recover, authorize, audit, and/or verify an ownership of at least a portion of the tracked assets and/or transactions involving the tracked assets. In some aspects, and as outlined above, tracked assets consistent with the disclosed embodiments may include, but are not limited to, units of a virtual currency or a crypto-currency, units of financial instruments held by one or more owners, and physical assets utilized by one or more individuals and/or entities.

Exemplary Processes for Tracking, Monitoring, and Valuing Specific Events Using Hybrid Block-Chain Ledgers In various embodiments described above, computer systems of centralized authority (e.g., a financial institution, etc.) augment conventional, decentralized block-chain ledger architectures by selectively encrypt ledger data to protect both a privacy of owners of tracked assets and a confidentiality of existing instruction sets maintained within the block-chain ledger. Further, by incorporating an encrypted rules engine and corresponding list of triggering events (e.g., an event triggers list) into each block of the conventional block-chain ledger architectures (and thus generating a hybrid, public-private block-chain ledger architecture), computer-implemented systems and methods consistent with the disclosed embodiments may perform operations that provide owners or holders tracked assets with recovery options in an event of fraud or malicious activity, while maintaining the public availability and verification characteristic of conventional block-chain ledgers.

Further, and consistent with the disclosed embodiments, client devices 101, 102, 104, and/or 106 may execute stored software applications (e.g., mobile applications provided by the centralized authority), which may cause client devices 101, 102, 104, and/or 106 to transmit data identifying transactions involving held assets to one or more computer systems across network 120 (e.g., one or more of peer systems 160). As described above, peer systems 160 may act as "miners" for hybrid block-chain ledgers consistent with the disclosed embodiments, and may competitively process the received transaction data (either alone or in conjunction with other data) to generate additional ledger blocks, which may be appended to the hybrid block-chain ledgers and distributed across peer systems 160 (e.g., through a peer-to-peer network) and to other connected devices of system 100 (e.g., across network 120).

The disclosed embodiments are, however, not limited to publicly accessible networks that validate and aggregate blocks of a hybrid block-chain ledger to record and track transfers of held assets (e.g., virtual currencies, etc.) between devices of individual users. In other aspects, hybrid block-chain ledger architectures consistent with the disclosed embodiments may be established and maintained not by a publicly accessible network of mining systems, but by a computer system associated with various different organizations (e.g., system 140 acting as a centralized authority for different and separate companies that are in communication with each other) and/or a centralized authority for different business units within one organization (e.g., system 140 acting as a centralized authority within the organization). As such, system 140 may be in communication with various devices operating across different organizations and/or across different units within the same organization (e.g., one or more of client devices 102, 104, and 106) in order to monitor various transactions, such as referrals that are being made.

In certain aspects, system 140's referral monitoring-specific, hybrid block-chain ledger architectures may provide a centralized mechanism to detect and track occurrences of specific events and/or transactions, such as referrals, across organizations and/or across business units within the same organization and further, to broadcast data indicative of these tracked occurrences within a uniform data structure accessible by devices operating across the different organizations and/or different units within the same organization. For example, modern organizations, such as financial institutions, law firms, large-scale equipment manufacturers, real estate companies, and oil and energy institutions, often work together by referring customers to each other. Moreover, each of these organizations have devices, such as computers, that execute various and often mutually-incompatible software applications (with corresponding mutually-incompatible data inputs and outputs). In addition, each of these organizations are often segmented into multiple, geographically-dispersed business units or lines-of-business having devices that also execute various and often mutually-incompatible software applications (with corresponding mutually-incompatible data inputs and outputs). In some aspects, system 140 may provide the devices across organizations and/or across business units within the same organization with common software applications (e.g., mobile applications, plug-ins called by other executable applications, such as web browsers, etc.) capable of capturing data indicative of specific events, such as referrals, and, through a corresponding call to an appropriate application programming interface (API), transmit predetermined portions of the captured data to system 140 for inclusion within one or more blocks of a hybrid block-chain ledger, as described below. Further, the software applications executed by the device may, in additional aspects, access portions of the hybrid block-chain ledger established and maintained by system 140 and selectively present the accessed portions of the hybrid block-chain ledger through a corresponding graphical user interface (GUI), e.g., as entries in a tabular data structure.

System 140 may thus function as a centralized clearinghouse to receive predetermined data indicative of occurrences of specific events from various devices disposed throughout different organizations and/or throughout different units within the same organization, and to establish and maintain hybrid block-chain ledger data that tracks the event occurrences in a format accessible to the various devices. Further, in additional aspects, the event triggers and rules engines incorporated into the exemplary hybrid block-chain ledgers described above (e.g., event trigger list 322 and rules engine 324 of FIG. 3) may enable system 140 to perform operations based on the captured event occurrences (e.g., based on single events, cumulative events, etc.) in a manner transparent to devices, individuals, and entities operating in different organizations and/or in the same organization.

For example, one large organization, such as a law firm, may offer distinct legal services, such as defending a client in a litigation matter. However, this large organization may not be able to offer financial or management services. As such, the organization may refer a client to another organization, such as a financial institution that may offer distinct product portfolios (e.g., financial products, management services etc.) to clients or customers. Due to the fact that these are two separate organizations, it may be difficult to monitor and quantify the referral. In some instances, the referral may be made within the same organization. For example, a customer may use the financial institution for checking account services and deal only with the account services unit of the institution. The customer may later decide that he or she wants to use the same financial institution for a home loan. An employee from the account services unit may refer the customer to the home mortgage unit of the institution. Although operating within a common organization, the fragmented nature of these distinct lines-of-business may result in a referral of a customer across the lines-of-business in order to access desired products and/or services. The lack of line-of-business integration may also lead to an environment characterized by incoherent customer management, which may prevent conventional block-ledger architectures from monitoring and quantifying occurrences of organization-specific events, such as cross-line-of-business referrals and cross-line-of-business interactions.

In one embodiment, system 140 may receive, from devices operating across the organizations and/or across units within the same organization, data indicative of customer referrals across organizations and/or across one organization's own lines-of-business and data indicative of customer activities that result from the customer referrals (e.g., acquisitions of available products or services, etc.). In certain aspects, system 140 may aggregate and store potions of the received data, portions of which system 140 may process to generate corresponding blocks of a hybrid block-chain ledger architecture using any of the exemplary techniques described above. Further, and based on the event trigger lists and rules engines described above, system 140 may detect a particular customer referral or customer activity (or a cumulative effect of multiple customer referrals or activities) that would trigger a reward to an organization, an employee, and/or line-of-business, and perform operations that provide the reward to the organization, employee and/or line-of-business in accordance with the rules engine.

By way of example, a customer of an organization, such as a law firm, may schedule an appointment to meet with an attorney. In some instances, the customer may call the law firm and an employee of the law firm (e.g., user 108) may schedule the appointment using client device 102. In some instances, to schedule the appointment, the employee (e.g., user 108) may execute a web browser or a mobile application provided by the law firm on a corresponding device (e.g., client device 102), and may provide input scheduling the appointment to the web page or a graphical user interface (GUI) presented to the customer by client device 102. In other instances, the customer may, using own client device 101, view a digital advertisement for legal services offered by the law firm (e.g., a Google Ad™, etc.) and upon selection of the digital advertisement, client device 101 may present a web page or other graphical user interface (GUI) that enables the scheduling of the appointment directly by the customer.

In some embodiments, to schedule the appointment, the employee may provide to client device 102 or customer may provide to client device 101 information that includes, but is not limited to, the customer's name, an appointment date, time, and location, and a potential value of the services being provided (i.e., a "lead value" of $600,000), which client device 102 may transmit to a component of system 140 along with information identifying client device 102 (e.g., a MAC address or an IP address) and a time stamp of the request. In some aspect, system 140 may execute software applications that schedule the appointment with the attorney at the requested date and time, and as described below, may perform operations that include portions of the received data as a "transaction" in a block of one or more hybrid block-chain ledger architectures.

The customer may meet with the attorney at the law firm and engage the law firm for representation on a legal matter. Prior to departing, the customer may inquire, at the law firm, whether the firm had any recommendations for a financial institution that can provide a home loan. The attorney may make a referral and have the employee who had scheduled the appointment, use, for example, client device 102 to make a referral and appointment with another organization, such as a financial institution. Client device 102 may execute software applications (e.g., a mobile application or plug-in provided by system 140) that establish the appropriate referrals based on data input by the employee at the law firm.

For example, the referral data may include, but is not limited to, the customer's name, a description of the product or service (e.g., home loan), an identity of the target line-of-business (e.g., home mortgage unit), and a lead value of the referral (e.g., a home loan values at $400,000). In some aspects, client device 102 may transmit the referral data to system 140 using any of the communications protocols outlined above, along with additional data that includes, but is not limited to, information identifying a source of the referrals (i.e., the attorney at the law firm), information identifying client device 102 (e.g., a MAC address or IP address), and time stamps for the referrals. In further aspects, system 140 may execute software applications that include portions of the received referral data as corresponding "transactions" in blocks of one or more hybrid block-chain ledger architectures, as outlined below.

In some aspects, the customer may attend the scheduled appointment with the loan officer at the physical branch of the financial institution, and after discussions, may acquire a mortgage having an actual value of $800,000 (e.g., as opposed to the $500,000 proposed upon scheduling the appointment). In an embodiment, a device held by the loan officer (e.g., client device 104) may execute software applications (e.g., stand-alone applications or plug-ins called by other executable applications) that capture data indicative of an outcome of the appointment (e.g., the acquisition of the $800,000 mortgage), which client device 104 may transmit to system 140 using any of the communications protocols outlined above. As described herein, system 140 may perform operations that incorporate portions of the received data into a corresponding "transaction" block of one or more hybrid block-chain ledger architectures. Further, in some aspects, system 140 may detect the acquisition of the mortgage as an event triggering a generation of an additional block within at least one of the hybrid block-chain ledger architectures (e.g., based on events trigger list 322), which may track lead and actual values associated with the appointment (i.e., an actual value of $800,000, and the lead value of $500,000) and information associated with an employee or line-of-business of the financial institution responsible for the lead and the mortgage (i.e., the loan officer).

Further, prior to departing the branch, the customer may inquire about the financial institution's wealth management and commercial banking services. For example, the customer may consider transferring management of a portion of an investment portfolio (e.g., valued at $400,000) to the wealth management unit of the financial institution, and may express interest in opening a revolving credit line of $500,000 with the financial institution's commercial banking unit. In certain aspects, a customer service representative of the financial institution may refer the customer to appropriate representatives of the wealth management and commercial banking units, and a device of the customer service representative (e.g., client device 104) may execute software applications (e.g., a mobile application or plug-in provided by system 140) that establish the appropriate referrals based on data input by the customer service representative.

For example, the referral data may include, but is not limited to, the customer's name, a description of the product or service (e.g., wealth management services or revolving commercial credit lines), an identity of the target line-of-business (e.g., the wealth management unit or the commercial banking unit), and a lead value of the referral (e.g., a transfer of a portfolio valued at $400,000 or a $500,000 line of credit). In some aspects, client device 106 may transmit the referral data to system 140 using any of the communications protocols outlined above, along with additional data that includes, but is not limited to, information identifying a source of the referrals (i.e., the customer service representative at the branch), information identifying client device 104 (e.g., a MAC address or IP address), and time stamps for the referrals. In further aspects, system 140 may execute software applications that include portions of the received referral data as corresponding "transactions" in blocks of one or more hybrid block-chain ledger architectures, as outlined below.

In further aspects, devices (e.g., client device 106) associated with the representatives of the wealth management and commercial banking units (i.e., the target lines-of-business of the customer service representative's referrals) may capture information indicative of the customer's activities in response to the referrals. For instance, and in response to the customer service representative's referral, the customer may schedule an appointment with the representative of the wealth management unit (e.g., using any of the processes described above), and after discussing the wealth management services offered by the financial institution, the customer may elect to transfer management of a larger portion of the investment portfolio to the financial institution (e.g., a portion of the portfolio valued at $1,000,000, as opposed to the lead value of $400,000). Further, and responsive to the customer service representative's referral, the customer may elect to obtain a $500,000 line-of-credit with the financial institution's commercial banking unit, and a device held by a representative of the commercial banking unit may capture data indicative of an outcome of the referral (e.g., the opening of the $500,000 portfolio), which the device may transmit to system 140 using any of the communications protocols outlined above.

In certain aspects, system 140 may perform operations that include portions of the received data as a "transactions" in blocks of one or more hybrid block-chain ledger architectures. Further, in some aspects, system 140 may detect the transfer of the investment portfolio or the opening of the line-of-credit as an event triggering a generation of additional blocks within at least one of the hybrid block-chain ledger architectures. The additional blocks may track, among other things, an actual value associated with the corresponding ones of the referrals (e.g., the $1,000,000 investment portfolio and/or the $500,000 line-of-credit), and information associated with an employee or line-of-business of the financial institution responsible for the lead (e.g., the customer services representative) and the activity (e.g., the representatives of the wealth management and commercial banking units).

As described above, the disclosed embodiments may be configured to provide, to system 140, data identifying not only the interactions and activities between a customer and various organizations and/or lines-of-business of an organization (e.g., a financial institution), but also data indicative of the interactions between the lines-of-business (e.g., cross-line-of-business referrals) that generate the customer activities. In certain aspects, system 140 may receive the data indicative of the customer activities and cross-line-of-business referrals from devices held by representatives of the lines-of-business that generate the referrals, and additionally or alternatively, that facilitate the activities or purchases that result from the referrals (e.g., the acquisition of the mortgage, the transfer of the investment portfolio, the opening of the line-of-credit, etc.). System 140 may, for example, characterize each referral, customer activity, or customer interaction as a "transaction," and may further associate each transaction with a corresponding customer (e.g., through a customer number, user name, or alpha-numeric identifier). Further, and prior to incorporation into blocks of one or more hybrid block-chain ledgers, system 140 may store data identifying the transactions associated with each customer as a data records in a customer-specific accounting ledger (e.g., within data repository 144).

FIG. 5A is a schematic diagram of an exemplary accounting listing or ledger 500 identifying referrals between organizations and line-of-business interactions involving a particular customer of one of the organizations, such as a financial institution, in accordance with the disclosed embodiments. For instance, and as described above, the customer (e.g., user 107) may interact with various organizations and various lines-of-business of the one organization, and devices of corresponding representatives of these lines-of-business may transmit data indicative of the interactions, referrals that result in the interactions, and further, activities that result from the interactions (e.g., engaging legal representation, the acquisition of a mortgage, the opening of a credit line, the transfer of an investment portfolio, etc.). In some aspects, and as a step preparatory to incorporating the received data into blocks of one or more hybrid block-chain ledgers, system 140 may store the received data associated with each of the interactions, referrals, and/or activities (i.e., the "transactions") as data records in a customer-specific accounting ledger within a portion of a local data repository (e.g., data repository 144).

For example, in FIG. 5A, accounting ledger 500 may store data records indicative of transactions involving user 107, and may include a data record 510 corresponding to user 107's request to schedule an appointment with a loan officer at the physical branch of a financial institution, wherein the request was submitted as a result of an advertisement (i.e., referral) by, for example, Google Ad™, which is part of a different organization or company. Further, in one aspect, data record 510 also identifies a time stamp of user 107's request (e.g., 3:01 p.m. on Nov. 10, 2014), a source of the request (e.g., web-based interface "EasyWeb tm"), a receiver of the request (e.g., the loan officer, John), and a lead value associated with the request (e.g., $500,000). Accounting ledger 500 also includes data record 512, which includes data indicative of user 107's acquisition of an $800,000 mortgage from the loan officer during the appointment at 3:00 p.m. on Nov. 11,2014. Data record 512 also identifies a sender of the acquisition (e.g., the loan officer, John), a receiver of the acquisition (e.g., the financial institution's residential lending unit), an actual value of mortgage (e.g., $800,000) and the lead value of the referral that led to the mortgage (e.g., $500,000).

Further, as illustrated in FIG. 5A, accounting ledger 500 also includes data record 514, which includes data indicative of the customer service representative's referral (e.g., CSR—Amy) of user 107 to the wealth management unit within the institution, and data record 516 tracks user 107's transfer of the $1,000,000 investment portfolio to the wealth management unit in response to the referral. For example, data record 514 indicates that the customer service representative (CSR-Amy) of the physical branch referred user 107 to a financial services representative of the wealth management unit (Wealth FSR—Kim) on Dec. 1, 2014, at 7:01 p.m., and further, that a lead value of the referral corresponds to $400,000. Further, and by way of example, data record 516 may indicate that, in response to a meeting with the wealth FSR—Kim, user 107 agreed to transfer management of an investment portfolio valued at $1,000,000 (e.g., the actual value of the activity) on Feb. 5, 2015, at 11:30 a.m. The wealth FSR, in data record 516, corresponds to the sender of the transfer, and the wealth management unit of the financial institution corresponds to a receiver of the transfer.

Accounting ledger 500 further includes data record 518, which includes data indicative of sharing the promotion on a social media website, such as Facebook®, for new infinite card. For example, data record 518 indicates that the promotion was shared on Jul. 16, 2015, at 7:01 p.m., and as discussed above, that a lead value of the referral corresponds to $1,000. Further, and by way of example, data record 518 may indicate that, in for the posting on the social media site, Bob (e.g., user 107) corresponds to a source of the activity, and another user on the site, Tim, corresponds to a receiver, and further, that lead value correspond to $1,000.

In some aspects, system 140 may generate an accounting listing or ledger similar in composition and structure to accounting ledger 500 for each customer of the financial institution that interacts within one or more of the multiple, segmented lines-of-business or that interacts with other organizations separate from the financial institution. Further, although described in terms of an accounting ledger that includes data records identifying time stamps, resulting activities, senders, receivers, and actual and lead values of a customer's interactions with the organization and/or lines-of-business and referrals between organizations and/or between the lines-of-business, the disclosed embodiments are not limited to these exemplary parameters. In further aspects, accounting ledgers consistent with the disclosed embodiments may include any additional or alternate parameters that characterize the customer's interaction with organizations and/or with the lines-of-business. By way of example, these additional or alternate parameters may include, but are not limited to, data identifying a system or device that generates the referral or interaction, an employee at the organization or at the source line-of-business, and an employee associated with the target organization or the target line-of-business.

As described above, system 140 may incorporate (i) data identifying the interactions and activities between a customer and the various organizations and/or the lines-of-business of one organization, such as the financial institution and (ii) data identifying the referrals across the various organizations and/or across lines-of-business of one of the organizations as discrete "transactions" within blocks on one or more hybrid block-chain ledger architectures. For example, system 140 may generate a new block for each of the transactions for each customer, and may concatenate each of the generated new blocks to an end of an appropriate one (or more) of the hybrid block-chain ledger files prior to hashing and encryption using any of the exemplary techniques described above.

In one embodiment, system 140 may establish and maintain one or more hybrid block-chain ledger for each customer of the organizations, such as financial institution (e.g., as stored in portions of data repository 144). For example, and as described above, a particular customer (e.g., user 107) may register for one or more digital banking services provided by the financial institution and additional or alternatively, may present one or more forms of identification at a physical branch of the financial institution to open or obtain access to one or more financial services accounts or products provided by financial institution (e.g., know-your-client (KYC) credentials specific to the financial institution, the financial services accounts, and/or the financial products). Upon registration for digital banking services and/or presentation of the KYC credentials, system 140 may establish, for the user 108, a public-private key pair and a crypto key using any of the exemplary techniques described above, and may transmit the generated keys to user 107 through secure, non-accessible and/or out-of-band communications. In certain aspects, system 140 may encrypt a generated event trigger list (e.g., event trigger list 322) with the customer's crypto key, may encrypt a generated rules engine (e.g., rules engine 324) with a master key associated with system 140 (e.g., acting as a centralized authority of the organization(s)), and further, may perform operations that hash the encrypted rules engine and list of triggering events into a genesis block of a hybrid block-chain ledger for the customer (e.g., genesis block 304).

In some embodiments, the hybrid block-chain ledger generated and maintained by system 140 on behalf of any user, such as user 110, may track each transaction involving user 110 (e.g., interactions and activities involving the various organizations, lines-of-business, referrals between organizations and/or lines-of-business that involve user 110, etc.) from initial registration and/or account creation using KYC credentials. For example, and as described above, a customer service representative at a physical branch of the financial institution may provide input to a corresponding device that identifies a referral of user 110 to the financial institution's wealth management unit by a different organization. The customer service representative's device may execute software applications that, through standard API call, transmit information characterizing the referral to system 140. In some aspects, system 140 may generate a data record for the transaction in a corresponding accounting ledger, and may incorporate the received transaction data into a new block of a corresponding customer-specific hybrid block-chain ledger using any of the exemplary techniques described above.

For example, and as described above, the data specifying a particular transaction, which system 140 may incorporate into the new block of the customer-specific hybrid block-chain ledger, may include, but is not limited to, an address of an immediately previous block of the customer-specific hybrid block-chain ledger, a block size, a block header, a value of a transaction counter, a corresponding time stamp, a sender line-of-business or organization, a receiver line-of-business or organization, data identifying a system or device that captured and transmitted the transaction data (e.g., a MAC address, IP Address, etc.), and employee of the sender line-of-business or organization that initiated the particular transaction, an activity associated with the transaction (e.g., an acquisition of a mortgage, an opening of a credit line, etc.), and an accounting ledger corresponding to the transaction (e.g., a corresponding one of the data records in FIG. 5A).

In certain aspects, system 140 may generate a distinct block of the customer-specific hybrid block-chain ledger for each transaction involving any user, such as user 110, and additionally or alternatively, may aggregate the transactions involving user 110 during a particular temporal period, and generate a block of the customer-specific hybrid block-chain ledger that incorporates data specifying the aggregated transactions using any of the exemplary techniques described above. For example, the particular temporal period may include, but is not limited to, one hour, a twenty-four hour period, a week, and any additional or alternate temporal period appropriate to system 140 and the transactions involving user 110.

In additional aspects, system 140 may be configured to track a value generated by a particular customer's interaction with one or more organizations and/or one or more lines-of-business in one organization by establishing and maintaining one or more side chains for the customer-specific hybrid block-chain ledger. By way of example, system 140 may identify a pair of sending and receiving organizations and/or lines-of-business associated with a particular transaction, and when a successive transaction corresponds to a different pair of sending and receiving organizations and/or lines-of-business, system 140 may perform operations that automatically generate a side chain that tracks the particular customer's interaction with the different pair of sending and receiving organizations and/or lines-of-business, append a value generated by the tracked interaction to a new block (i.e., a value block), and concatenate the value block to an end of the side chain.

Figure 5B:
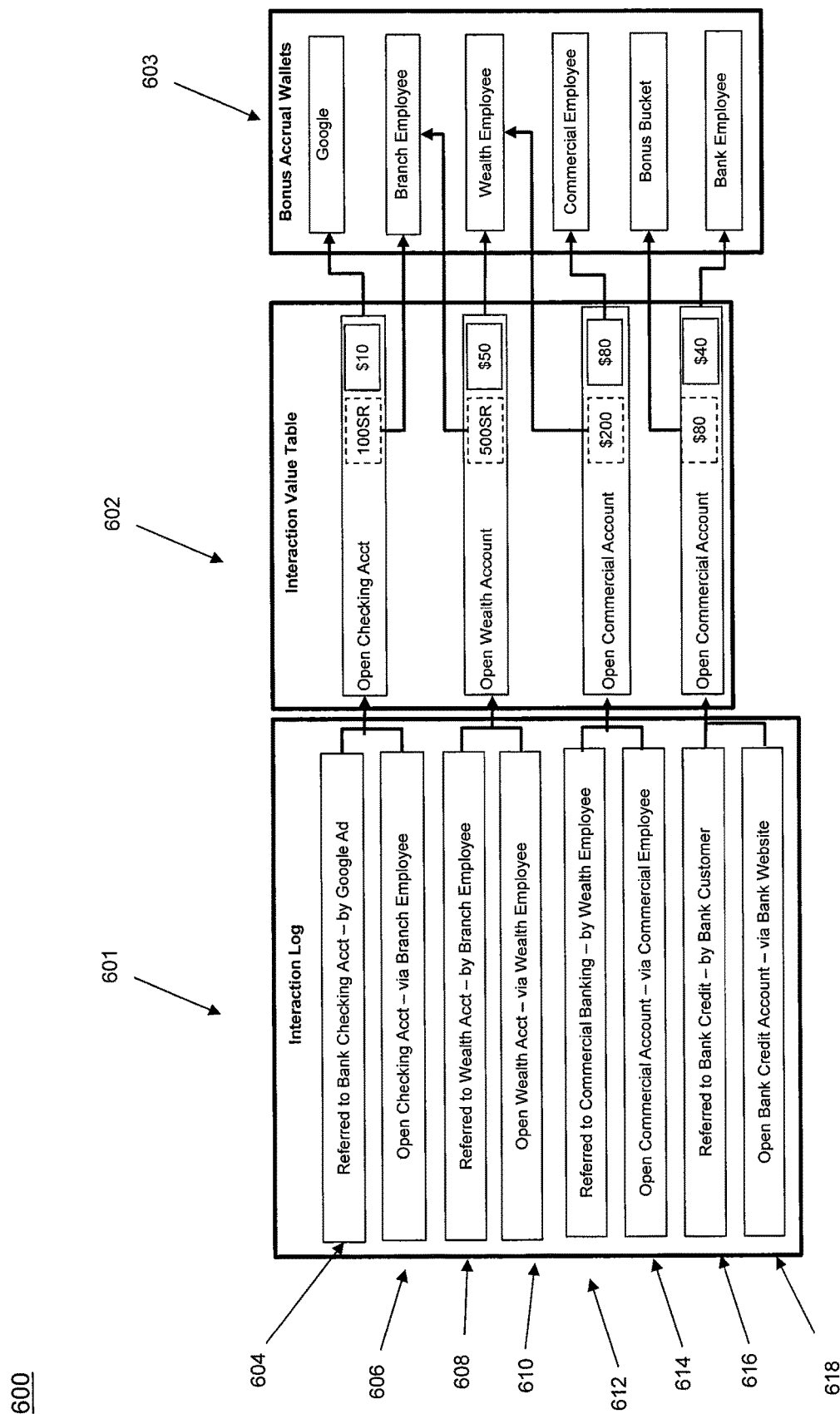

For example, in reference to FIG. 5A, system 140 may determine that the pair of sending and receiving lines-of-business associated with data records 514 and 516 (e.g., "CSR" and "Wealth") differ with respect to their transactions. Thus, in certain aspects, system 140 may establish a side chain for the particular customer (e.g., user 107) that tracks the particular customer's interaction with the branch ("Branch") and "Wealth" lines-of-business, and appends the $1,000,000 in value generated by the transfer of the particular customer's investment portfolio to the financial institution's wealth management division in a corresponding value block. In further aspects, system 140 may be configured to process each transaction tracked within the particular customer's hybrid block-chain ledger, and may establish a corresponding side chain and value block to track the particular customer's interaction with each distinct pair of source and target lines-of-business. Additionally, in some aspects, system 140 may automatically determine a total value generated by each of the established side chains by reading (or summing) the appended values on the corresponding value blocks (i.e., leaves of the side chains), thus determining values indicative of bonus payouts to employees of the organization, such as financial institution, that generated the side chains, as described in more detail below with respect to FIGS. 5B and 6.

In further aspects, system 140 may also execute stored software applications that implement a pruning algorithm at regular frequencies to terminate any duplicate side chains. For example, side-chain creation and maintenance processes consistent with the disclosed embodiments may verify that no other side chain exists for a particular combination of sending and receiving organizations and/or lines-of-business within one organization, and additionally or alternatively, may add an address of an existing side chain to allow for proper tracking of all interactions between that customer and a given set of sending and receiving organizations and/or lines-of-business within an organization.

The disclosed embodiments, which establish, maintain, and update hybrid block-chain ledger architectures for each customer of a financial institution, and which generate side chains to track values associated with each customer's interaction with various sending and receiving organizations and/or lines of business within an organization, may enable system 140 and other devices operating across organizations and units within an organization to track and value individual referrals of each customer between the organizations and/or lines-of-business within an organization. As the number of customer interactions increase across the organizations and/or the lines-of-business within an organization, and further, as a number of organizations and/or distinct lines-of-business increase across the organization, the computational effort required to track and value interactions involving each customer on corresponding hybrid block-chain ledgers and associated side chains increases, often rendering impractical the tracking of leads from each employee of the organization.

In other embodiments, and in view of the computational difficulties related to referral-value tracking described above, system 140 may augment the customer-specific hybrid block-chain ledgers not with corresponding side chains, but with a peer-to-peer transaction block chain that tracks the actual values generated by corresponding referrals between organizations and/or lines-of-business within one organization. For instance, an events trigger list incorporated into each customer-specific hybrid block-chain ledger (e.g., event trigger list 322) may identify, as a triggering event, an occurrence of a particular customer activity involving available financial services products or services (e.g., an opening of a line of credit, an acquisition of a mortgage or other debt product, a transfer in management of an investment portfolio to the financial institution, etc.). Further, a rules engine incorporated into each customer-specific hybrid block-chain ledger (e.g., rules engines 324) may include a rule that, in response to the occurrence of the particular customer activity, causes system 140 to generate a new value block in the peer-to-peer transaction block chain to highlight a true value generated by the particular customer activity. The generated value blocks may, in certain aspects, identify not only an actual value resulting from the particular customer activity, but also an employee of the financial institution that initiated a referral resulting in the particular customer activity (e.g., a referral of user 110 from a customer service representative at a branch of the financial institution to a representative of the financial institution's wealth management unit).

In additional or alternate embodiments, system 140 may track value generated by customer interaction with various organizations and/or lines-of-business within one organization by generating a hybrid block-chain ledger for each employee of the organization (e.g., an employee-specific hybrid block-chain ledger). In some aspects, system 140 may identify transactions involving one or more of the employees, and may incorporate data specifying the identifier identified transactions with corresponding ones of the employee-specific hybrid block-chain ledgers using any of the exemplary techniques outlined above. For instance, and in response to a referral involving a particular employee of the organization, system 140 may perform operations that generate a new side chain for a corresponding employee-specific hybrid block-chain ledger, which may be updated with appropriate transaction data using any of the exemplary techniques outlined above, and which may be terminated upon an occurrence of a particular customer activity (e.g., an acquisition of a mortgage resulting from the referral, an opening of a credit line in response to the referral, etc.).

Based on event trigger lists and rules engines incorporated into the corresponding customer- and employee-specific hybrid block-chain ledgers, system 140 may generate a new block on a corresponding customer-specific block chain that incorporates data summarizing the activities and interactions within the now-terminated side chain, and that tracks the lead and actual value associated with the corresponding referral. In certain instances, system 140 may format the new block data in a manner appropriate to the individual block-chain transactions described above, and may augment the new block data with a source line-of-business and a lead value of the corresponding referral, along with data identifying, among other things, an employee associated with the particular customer activity (e.g., a loan officer that realized the customer's mortgage, etc.), an actual value resulting from the corresponding referral, and incentive amounts associated with the employees that generated the referral and that realized the activity (e.g., as set forth in the rules engines incorporated into the corresponding customer- and employee-specific hybrid block-chain ledgers).

In additional embodiments, system 140 may execute one or more software application that establish, store, and maintain three hybrid block-chain ledgers that track and value a particular customer's interactions with various lines-of-business of, for example, a financial institution in a computationally efficient manner. The three hybrid block-chain ledgers may, in some aspects, include a first hybrid block-chain ledger that tracks the interactions between the particular customer and the various lines-of-business, and a second hybrid block-chain ledger that tracks the activities of a particular employee (e.g., in realizing acquisitions and sales of available financial products, in generating referrals of particular customers across the various lines-of-business, etc.), and a third hybrid block-chain ledger that tracks the interactions between the particular customer and the particular employee.

In one aspect, the first hybrid block-chain ledger may be structured in a manner similar to the customer-specific hybrid block-chain ledgers described above, and system 140 may establish, maintain, and administer the first hybrid block-chain ledger using any of the exemplary techniques described above. In further aspects, system 140 may be configured to augment the transaction data within individual blocks of the first hybrid block-chain ledger (e.g., the exemplary transaction data described above) to include data that identifies an employee who enabled the particular customer activity associated with the transactions (e.g., acquiring a mortgage, transferring management of investment portfolios, opening a line-of-credit, etc.) and additional or alternatively, data that identifies a portal (e.g., a web page, etc.) associated with the particular customer activity. In certain embodiments, and similar to the customer-specific hybrid block-chain ledgers described above, the first hybrid block-chain ledgers may reside identify and track the different touch points of the corresponding customers with the financial institution.

The second hybrid block-chain ledger may, in certain aspects, be structured in a manner similar to the employee-specific hybrid block-chain ledgers described above, and system 140 may establish, maintain, and administer the second hybrid block-chain ledger using any of the exemplary techniques described above. In some instances, and similar to the employee-specific hybrid block-chain ledgers described above, the second hybrid block-chain ledgers may track the interactions between corresponding employee and customers of the financial institution, and individual blocks of the second hybrid block-chain ledgers may identify incentives for referral and bonuses for sales and acquisitions of financial services accounts or products.

In additional aspects, the third hybrid block-chain ledger may mirror the transaction data included within the first and second hybrid block-chain ledgers, and system 140 may establish, maintain, and administer the second hybrid block-chain ledger using any of the exemplary techniques described above. The third hybrid block-chain ledger may, in some aspects, include additional data that tracks a relational nature of the interactions between the particular customer, the particular employee, and the various organizations and/or lines-of-business of one organization, such as the financial institution. Further, system 140 may execute processes that validate the transaction data included within blocks of the first and second hybrid block-chain ledgers using corresponding transaction data within the third hybrid block-chain ledger. By way of example, system 140 may perform the exemplary validation processes described above at regular intervals (e.g., daily, weekly, etc.) or in response to specific events.

Exemplary Processes for Providing Event-Based Rewards using Hybrid Block-Chain Ledgers In the embodiments described above, system 140 may establish, maintain, and administer one or more hybrid block-chain ledger architectures that track customer interactions among various organizations and/or various segmented lines-of-business of an organization and further, that track occurrences of specific events and activities (i.e., collectively "transactions") that result from the customer interactions.

In additional embodiments, the hybrid block-chain ledger architectures described above may enable system 140 to administer, on behalf of organization(s), programs that reward employees of the organization(s) for generating referrals across different organizations or across fragmented lines-of-business within one organization and further, for certain customer activities, such as purchases or acquisitions of various products and services that result from the generated referrals. For example, and as described above, hybrid block-chain ledger architectures consistent with the disclosed embodiments may include encrypted lists of event triggers (e.g., event trigger list 322) and encrypted rules engines (e.g., rules engine 324). System 140, acting as a centralized authority for the organization(s), may establish and encrypt the event trigger list using a customer-specific cryptographic key (e.g., crypto keys 302A and 302B), and may establish and encrypt the rules engine using an organization-specific master key held confidential by system 140 (e.g., master key 301). In certain aspects, system 140's encryption of the event triggers list using the customer-specific cryptographic keys may enable employees of the organization to access the encrypted events trigger list (e.g., through software applications executed by corresponding devices) and view the various referrals and customer activities that result in the provision of an award or bonus.

In an embodiment, the encrypted event trigger list may identify one or more cross-organizations referrals and/or cross-line-of-business referrals that trigger the provision of rewards to employees of the organization (e.g., a referral reward). For example, system 140 may establish, through the event triggers list, that a generation of a cross-line-of-business referral by one or more devices within the organization (e.g., a device of a customer service representative that refers a customer from a physical branch of a financial institution to the financial institution's commercial banking unit) represents an event that triggers a provision of the referral reward to an employee that generated the referral.

The rules engine may, in certain aspects, associate one or more operations performable by system 140 (e.g., providing referral rewards or bonuses to organization employees) with corresponding ones of the trigger events identified within the encrypted event trigger list (e.g., cross-line-of-business referrals). For example, upon detection of a referral of customer by an employee of the organization, system 140 may access and decode the encrypted rules engine, parse the decoded rules engine to identify one or more of the operations associated with the detected referral, and further, perform the one or more identified operations to provide an appropriate referral reward to the employee that generated the detected referral. This same process can be done with cross-organization referrals.

In additional embodiments, a cross-organization or a cross-line-of-business referral may result in a customer's purchase or acquisition of an available product or service (e.g., the customer's acquisition of a commercial line-of-credit from the financial institution). In some aspects, system 140 may, through the event trigger list, establish that the customer's referral-driven purchase or acquisition represents and event that triggers a provision of a reward (e.g., a sales reward) to an employee that realized the purchase or acquisition and additionally or alternatively, a provision of an additional reward (e.g., an referral reward) to the employee that generated the referral. Further, by way of example, and upon detection of the customer's referral-driven purchase or acquisition, system 140 may access and decode the encrypted rules engine, parse the decoded rules engine to identify one or more of the operations associated with the detected purchase or acquisition, and further, perform the one or more identified operations to provide an appropriate sales reward to the employee that realized the purchase or acquisition, and additionally or alternatively, an appropriate referral reward to the employee that generated the referral resulting in the purchase or acquisition.

The decoded rules engine may also include correlation data that, in certain aspects, maps characteristics of detected referrals and/or customer activities (i.e., purchases or acquisitions of available products) to appropriate types and values of referral and/or sales rewards. For instance, in response to the detected referral and/or detected customer activity, system 140 may perform operations that parse one or more blocks of the hybrid block-chain legers described above (and additionally or alternatively, blocks of corresponding side chains) to identify and extract one or more characteristics of the detected referrals and/or customer activities.

By way of example, characteristics of a detected referral may include, but are not limited to, a time stamp of the detected referral, source and target lines-of-business associated with the detected referral, data identifying a device that generated the detected referral (e.g., a MAC address, IP Address, etc.), an employee that initiated the detected referral, a lead value associated with the detected referral, and a potential customer activity associated with the detected referral. Further, in some instances, characteristics of a detected purchase or acquisition (i.e., that results from a prior detected referral) may include, but are not limited to, a time stamp of the detected purchase or acquisition, source and target lines-of-business associated with the detected purchase or acquisition, data identifying a device that generated the realized purchase or acquisition (e.g., a MAC address, IP Address, etc.), an employee that initiated the realized purchase or acquisition, an actual value of the realized purchase or acquisition, data identifying the realized purchase or acquisition, and any of the characteristics of the detected referral from which the realized purchase or acquisition results.

System 140 may, in certain instances, compare one or more of the extracted characteristics of the detected referral and/or the detected activity with the accessed correlation data to determine an appropriate referral reward and/or sales award. In certain aspects, the determined referral reward and/or sales award may include a financial benefit, and a value of the financial benefit may be specified by the accessed correlation data. The financial benefit may be a cash award (e.g., provided by system 140 to an employee during a coming pay period) and additionally or alternatively, may include a cash equivalent, such as a prepaid or gift card. In other aspects, however, the determined referral reward and/or sales award may include a non-financial benefit, which may include, but is not limited to, a transit benefit or pass, a reduction in a monthly parking fee, a fee reduction or credit on a monthly gym membership, and any additional or alternate non-financial benefit accessible to system 140 for provision or assignment to one or more employees of an organization.

By way of example, a reward type (e.g., a financial or non-financial benefit) and/or the value characterizing the reward may be specified for a particular combination of detected referral and/or detected activity characteristics by the organization or financial institution, e.g., in conformity with one or more business and/or employment practices of the organization. In other instances, an assignment of specific types and/or values of rewards to particular combinations of detected referral and/or detected activity characteristics may conform to one or more regulatory or policy-based restrictions imposed on the organization by a governmental entity.

In some embodiments, and upon determination of the appropriate referral reward and/or sales award, system 140 may perform operations (e.g., as set forth in the accessed rules engine) that provide the appropriate sales reward to the employee that realized the detected activity and additionally or alternatively, that provide the appropriate referral reward to the employee that generated the detected activity (e.g., in step 416 of FIG. 4). In some aspects, system 140 may perform operations that initiate an electronic transfer of funds consistent with a financial benefit to an account of the corresponding employee. In other aspects, and through a corresponding API call to one or more external computer systems, system 140 may perform operations that generate and/or provide a non-cash award to the corresponding employee. For example, system 140 may execute software applications that, through a corresponding API call to a computer system of the e-commerce retailer (e.g., Amazon.com™, etc.), generate and deliver to the corresponding employee (e.g., through an appropriate email address) a pre-paid digital gift card loaded with a balance consistent with the financial award.

Additionally or alternatively, system 140 may perform operations that generate and/or provide a non-financial benefit to the corresponding employee. For example, system 140 may execute software applications that, through a corresponding API call to a computer system associated with a local transit authority (e.g., the Toronto Transit Commission™ or the WMATA™), generate and deliver to the corresponding employee a transmit benefit consistent with the non-financial referral or sales award. The disclosed embodiments are, however, not limited to these exemplary operations, and in other systems, system 140 may perform any additional or alternate operations to generate and deliver financial and non-financial referral and/or sales rewards that would be appropriate to the organization and the corresponding rewards.

By way of example, and as described above, a customer of a financial institution may consider transferring management of a portion of an investment portfolio (e.g., valued at $400,000) to a wealth management unit of the financial institution. In certain aspects, a customer service representative of the financial institution may refer the customer to a financial services representative of the wealth management unit, and a device of the customer service representative (e.g., client device 106) may execute software applications (e.g., a mobile application or plug-in provided by system 140) that establish the appropriate referral based on data input by the customer service representative.

For example, the referral data may include, but is not limited to, the customer's name, a description of the product or service (e.g., wealth management services), an identity of the target line-of-business (e.g., the wealth management unit), an identity of the customer service representative and the generating device, and a lead value of the referral (e.g., a transfer of a portfolio valued at $400,000). In some aspects, client device 106 may transmit the referral data to system 140 using any of the communications protocols outlined above, along with additional data that includes, but is not limited to, information identifying a source of the referrals (i.e., the customer service representative at the branch), information identifying client device 106 (e.g., a MAC address or IP address), and time stamps for the referrals. In further aspects, system 140 may execute software applications that include portions of the received referral data as corresponding "transactions" in blocks of one or more hybrid block-chain ledger architectures, using any of the exemplary techniques described above.

Additionally, and in one aspect, a device held by the financial services representative of the wealth management unit (i.e., the target line-of-business of the customer service representative's referral) may capture information indicative of the customer's activities in response to the referrals. For instance, and in response to the customer service representative's referral, the customer may schedule an appointment with the representative of the wealth management unit (e.g., using any of the processes described above), and after discussing the wealth management services offered by the financial institution, the customer may elect to transfer management of a larger portion of the investment portfolio to the financial institution (e.g., a portion of the portfolio valued at $1,000,000, as opposed to the lead value of $400,000). In certain aspects, a device of the financial service representative that realized the customer activity (e.g., the transfer of management of the $1,000,000 portfolio) may capture data indicative of the customer's realized activity based on data input by the financial services representative (e.g., data input into a graphical user interface (GUI) presented by an executed application).

For example, the customer activity data may include, but is not limited to, the customer's name, a time stamp of the realized activity, a description of the activity (e.g., transfer of portfolio management), an identity of the source line-of-business (e.g., the wealth management unit), an identity of the financial services representative and the realizing device, a lead value of the referral (e.g., a potential transfer of a portfolio valued at $400,000), and an actual value of the activity resulting from the referral (e.g., an actual transfer of a portfolio valued at $1,000,000). In some aspects, the device of the financial services representative may transmit the activity data to system 140 using any of the communications protocols outlined above. In further aspects, system 140 may execute software applications that include portions of the received referral data as corresponding "transactions" in blocks of one or more hybrid block-chain ledger architectures, using any of the exemplary techniques described above.

In certain aspects, and using any of the exemplary techniques described above, system 140 may execute software applications that parse blocks of one or more of the generated hybrid block-chain ledgers to generate and record lead and/or actual values associated with the customer's referral from the branch to the wealth management unit (e.g., the lead value of $400,000) and with the customer activity resulting from the referral (e.g., the actual value of $1,000,000).

FIG. 5B illustrates a schematic diagram of an exemplary accounting listing or ledger 600 identifying referrals between organizations and/or line-of-business units within one organization and the particular customer activity or transaction, along with the respective referral payouts or sales or transactions rewards in accordance with the disclosed embodiments.

In some embodiments, ledger 600 includes an interaction log 601 that identifies the transaction, such as the referral and/or the customer activity resulting from the referral. An interaction value table 602 includes the amounts for each of the referral bonus payouts and the product or service sale bonus payouts that can be obtained by the organization and/or the employees for the respective transactions. A bonus accrual wallets table 603 identifies the recipients (e.g., the organization and/or the employees) of the product or sale bonus payouts (blocks with broken lines) and the referral bonus payouts (blocks with solid lines).

For a first interaction record 604, ledger 600 identifies the interaction as a referral for a customer to an organization, such as a bank, by another organization via, for example, an advertisement, such as Google Ad™. A second interaction record 606 is the opening of a checking account by a branch employee for the referred customer, wherein interaction record 606 is based on an interaction that is a result of the referral of interaction record 604. The corresponding product sale bonus payout is 100 SR for the branch employee who opened the account and the corresponding referral bonus is $10 for Google®. The product sale bonus payout and the referral bonus payout can be calculated based on various parameters, such as the type of referral, interaction and/or transaction, as explained in more detail below with respect to FIG. 6.

A third interaction record 608 is of a referral within the bank, wherein the branch employee refers the customer to the bank's wealth management and accounting department. A fourth interaction record 610 identifies the opening of the wealth account by a different bank employee, such as the wealth department employee, wherein fourth interaction record 610 is based on an interaction that is the result of the referral of interaction 608. The corresponding product sale bonus payout is 500 SR for the branch employee and the corresponding referral bonus payout is $50 for the wealth department employee.

A fifth interaction record 612 is of a referral for the customer to the commercial banking department within the bank by the wealth department employee and a sixth interaction record 614 corresponds to the resulting opening of a commercial account for the customer via a commercial banking department employee within the bank. The corresponding product sale bonus is $200 for the wealth department employee of the bank and the corresponding referral bonus payout is $80 for the commercial banking department employee.

A seventh interaction record 616 is of a referral for a bank credit card by a customer of the bank and an eight interaction record 618 is of the resulting opening of the bank credit card via the bank website. In this situation, the corresponding product sale bonus payout of $80 may go to a general bucket used by the bank and the referral bonus of $40 may go to the bank employee who opened the credit card account.

Further, and as described in more detail below with respect to FIG. 6, system 140 may determine that the customer referral and/or the resulting customer activity represents an event triggering disbursement of one or more referrals and/or sales rewards to employees of, for example, the bank, and system 140 may perform operations that identify the appropriate referral and/or sales reward bonus payouts to appropriate employees of the organization(s).

Figure 6:
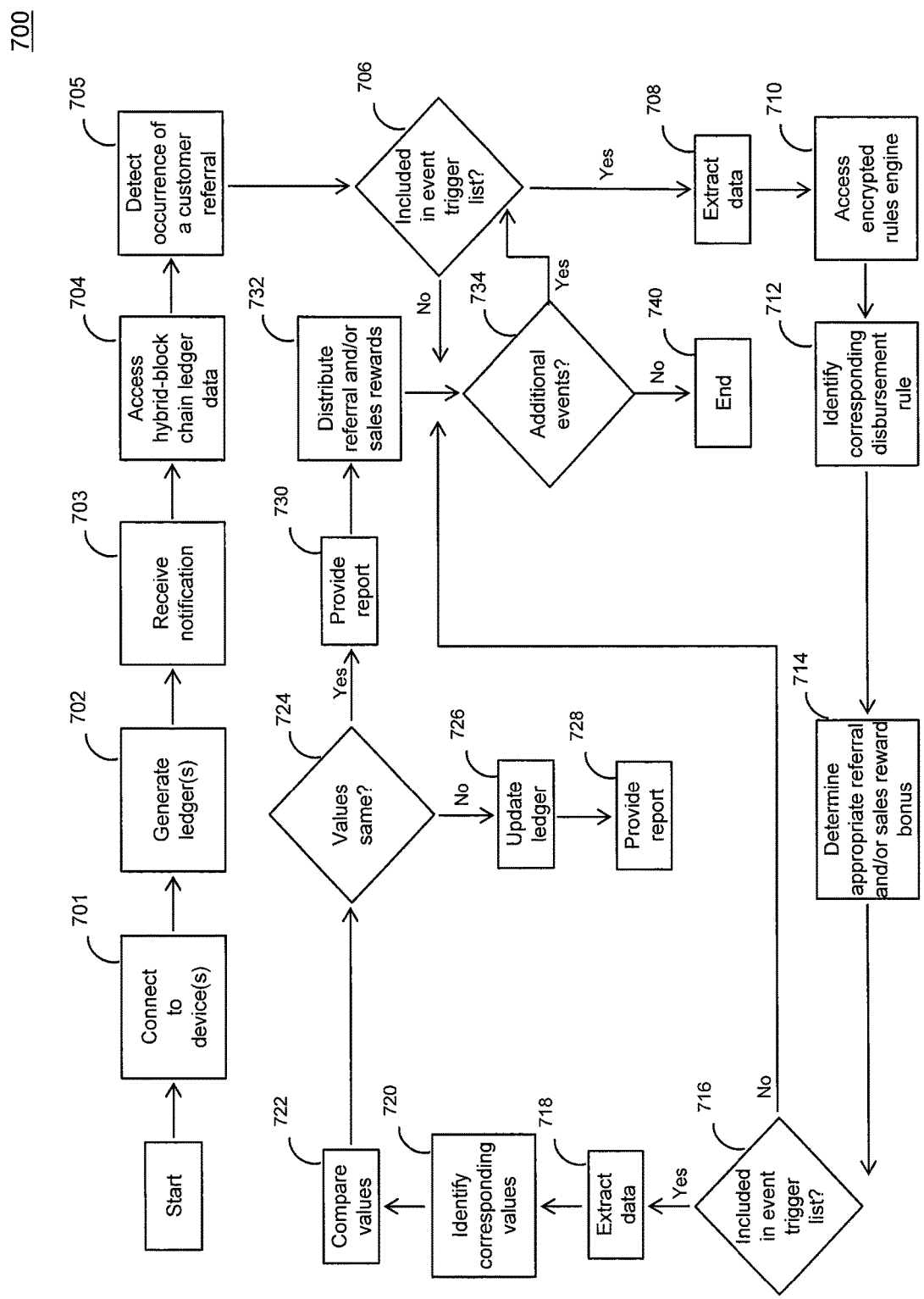
FIG. 6 is a flowchart of an exemplary method for monitoring at least one referral in accordance with some embodiments of the present disclosure.

FIG. 6 is a flowchart of an exemplary method 700 for monitoring at least one referral by automatically performing operations in response to events tracked within a hybrid block-chain ledger, in accordance with disclosed embodiments. In an embodiment, computer system associated with a centralized authority for the organization(s) or within one organization (e.g., system 140 associated with business entity 150) may establish and maintain one or more hybrid block-chain ledgers (and additionally or alternatively, one or more corresponding side chains) that track customer referrals across organizations and/or across fragmented lines-of-business and customer activities that result from the customer referrals. In some aspects, system 140 may execute software instructions to determine that one or more of the tracked referrals between organizations or within an organization and customer activities correspond to an event requiring disbursement of rewards to employees of the organization(s), and further, to perform operations that identify and provide the rewards to the employees.

In certain aspects, system 140 may connect to one or more of client devices 101, 102, 104, and/or 106 in step 701. As such, data can be transmitted between system 140 and client devices 101, 102, 104, and/or 106. In some embodiments, the data can include information such as various referrals events or interactions that can occur, such as a referral from one organization using, for example, client device 102, to another organization, which uses, for example, client device 104. In some embodiments, the information can be various referrals that occur within the organization between different business units within the same business unit. For example, one business unit may make a referral using client device 104 to another business unit, which uses client device 106. In addition, the information can also include customer activities or a transactions, such as the opening of a checking account. Along with the referral events and/or customer activities, additional information can be communicated, such as expected bonus values that correspond to the different referral events or expected sales rewards for the corresponding customer activity. For example, a referral from a law firm to a financial institution for a particular product or service sale, such as for the opening of a checking account, may have an expected value for the referral that was agreed upon by the parties. An expected value for the product or service sale transaction may also exist based on, for example, employee agreements with the organization(s). In some embodiments, each referral event corresponds to a different expected bonus value and each customer activity corresponds to a different expected sales reward value.

In step 702, system 140 generates at least one distributed listing or ledger based on the data received and stores the distributed ledger(s). In some embodiments, the distributed ledger includes a block-chain made up of several blocks or a sequence of units such that each block or unit corresponds to a different expected bonus value and the corresponding referral event.

In some embodiments, for example, a customer (e.g., user 107) can use a computing device, such as client device 101, and make an appointment with an organization, such as a law firm. As described above, in some instances, the customer may call the law firm and an employee of the law firm (e.g., user 108) may schedule the appointment using client device 102. In some instances, to schedule the appointment, the employee (e.g., user 108) may execute a web browser or a mobile application provided by the law firm on a corresponding device (e.g., client device 102), and may provide input scheduling the appointment to the web page or a graphical user interface (GUI) presented to the customer by client device 102. In other instances, the customer may, using own client device 101, view a digital advertisement for legal services offered by the law firm (e.g., a Google Ad™, etc.) and upon selection of the digital advertisement, client device 101 may present a web page or other graphical user interface (GUI) that enables the scheduling of the appointment directly by the customer.

The customer may meet with the attorney at the law firm and engage the law firm for representation on a legal matter. Prior to departing, the customer may inquire, at the law firm, whether the firm had any recommendations for a financial institution that can provide a checking account. The attorney may make a referral and have the employee who had scheduled the appointment, use, for example, client device 102 to make a referral and appointment with another organization, such as a financial institution, and may contact the organization directly. In some embodiments, client device 102 may connect with a computing device at the other organization, such as client device 104. For example, an email may be sent.

After the referral and after the customer has gone to the other organization and performed a transaction based on the referral, such as open a checking account, then client device 102 and/or client device 104 may provide a notification received by system 140 in step 703, wherein the notification identifies the referral and/or the customer activity. For example, client device 102 may execute software applications (e.g., a mobile application or plug-in provided by system 140) that establish the appropriate referral based on data input by the employee at the law firm. For example, the referral data may include, but is not limited to, the customer's name, a description of the product or service (e.g., checking account), an identity of the target line-of-business (e.g., checking account unit), and a lead value of the referral (e.g., checking account value at $20,000). In some aspects, client device 102 may transmit the referral data to system 140 using any of the communications protocols outlined above, along with additional data that includes, but is not limited to, information identifying a source of the referrals (i.e., the attorney at the law firm), information identifying client device 102 (e.g., a MAC address or IP address), and time stamps for the referrals. In further aspects, system 140 may execute software applications that include portions of the received referral data as corresponding "transactions" in blocks of one or more hybrid block-chain ledger architectures, as outlined below. Similarly, the other organization, such as the financial institution, may also provide notification regarding the checking account that opened as a result of the referral.

After receiving the notification, system 140, in step 704, executes software applications that access data corresponding to one or more generated and stored hybrid block-chain ledgers, and further, that parse discrete blocks of the accessed hybrid block-chain ledger data to identify an occurrence of a customer referral and/or an occurrence of customer activity resulting from the customer referral (e.g., in step 705). By way of example, system 140 may establish and maintain the one or more hybrid block-chain ledgers using any of the exemplary techniques described above, and may store the data corresponding to the established and maintained hybrid block-chain ledgers in a portion of a locally accessible data repository (e.g., data repository 144) and additionally or alternatively, within a data repository accessible to system 140 across network 120 (e.g., network accessible cloud-based storage).

For example, and using any of the exemplary techniques described above, system 140 may identify, within at least one of the hybrid block-chain ledgers, data indicative of the referral for a checking account made by the law firm to the financial institution and/or the opening of the account made by the customer at the financial institution. In some aspects, system 140 may access the stored list of triggering events (e.g., within database 144), and, in step 706, may determine whether the list of triggering events includes the identified customer activity (e.g., opening of the checking account) and/or the identified referral made by the law firm to the financial institution. If system 140 were to identify the identified customer activities and/or referral event within the list of triggering events (e.g., step 706; YES), system 140 may further process the hybrid block-chain ledger data to extract data characterizing the identified customer activities and/or the referral event (e.g., in step 708).

In step 708, and using any of the exemplary techniques described above, system 140 may extract, from the accessed hybrid block-chain ledger data, additional data that characterizes the customer referral and the resulting customer activity. For example, as described above, the extracted characteristic data may include, but is not limited to, data identifying the attorney or representative that generated the customer referral, the lead value associated with the referral (e.g., the potential value of $30,000), data identifying the financial services representative that realized the opening of the checking account, the actual value of the checking account (e.g., the actual value of $20,000), and time stamps of the customer referral and the realized account opening.

In some embodiments, system 140 may determine an outcome value for the referral and/or customer activity. For example, in some embodiments, the outcome value can be a product or service sale bonus value and/or a referral bonus value (i.e., sales rewards and/or referral rewards) that corresponds to the opening of the checking account and the referral that is made. The outcome value can be based on various factors, such as the value of the checking account (i.e., $20,000). In some embodiments, the outcome value can be a percentage of the actual value of the transaction. In some embodiments, and as described above, system 140 may determine that the identified customer activity and customer referral represent events triggering a disbursement of referral and/or sales rewards bonuses. In additional aspects, system 140 may decrypt and access the encrypted rules engine in step 710 (e.g., using the master encryption key), and further, may identify at least one of the rules specifying a disbursement of referral bonus and/or sales rewards bonus that corresponds to the identified customer referral and the realized customer activity (e.g., in step 712). Based on the at least one identified disbursement rule, and a comparison of the extracted characteristic data and correlation data included within the decrypted rules engine, system 140 may determine at least one referral reward and at least one sales reward appropriate to the identified customer respective referral and resulting customer activity (e.g., in step 714).

For instance, system 140 may determine that the financial services representative that realized the opening of the checking account should receive a sales reward of $100, and that the attorney at the other organization who made the referral should receive a reward of $50. In some embodiments, the reward may be a prepaid gift card (e.g., a Starbucks™ card or an Amazon.com™ card) loaded with $50 in funds. The disclosed embodiments are, however, not limited to these exemplary rewards, and in additional embodiments, system 140 may determine the provide any additional or alternate financial or non-financial benefit to the customer and financial service representatives that would be consistent with the disbursement rules and appropriate to the financial institution.

In some embodiments, system 140 may determine whether the outcome value (e.g., determined value(s) for the referral bonus and/or sales rewards) are accurate. For example, in step 716, system 140 again may determine whether the list of triggering events includes the identified customer activity (e.g., opening of the checking account) and/or the identified referral made by the law firm to the financial institution, which resulted in the opening of the account. If system 140 were to identify the identified customer activities and/or referral within the list of triggering events (e.g., step 716; YES), system 140 may further process the hybrid block-chain ledger data to extract data characterizing the identified customer activities and/or the referral (e.g., in step 718). In step 720, system identifies the corresponding expected values, such as the expected referral bonus value and/or the expected sales reward value.

In step 722, system 140 compares the determined value for the referral bonus and/or the determined value for the sales rewards with the corresponding expected values. In step 724, system 140 identifies whether the determined value for the referral bonus and/or the determined value for the sales reward are the same as the corresponding expected values. If the determined value for the referral bonus and/or the determined value for the sales reward are not the same as the corresponding expected values (e.g., step 724, NO), then system 140 updates the distributed ledger in step 726. For example, in some embodiments, system 140 can add the determined values as new expected values to corresponding events as new blocks to the block-chain. In step 728, system 140 provides a report to client device 102 and/or to client device 104 to notify the respective users, user 108 and user 110, that the determined value for the referral bonus and/or the determined value for the sales reward are not the same as the corresponding expected values.

Alternatively, if the determined value for the referral bonus and/or the determined value for the sales reward are the same as the corresponding expected values (e.g., step 724, Yes), then system 140 can provide a report to client device 102 and/or to client device 104 regarding the accuracy of the determined value for the referral bonus and/or the determined value for the sales reward in step 730. System 140 may, in step 732, perform operations that automatically distribute the determined referral and/or sales rewards to corresponding employees of the respective organizations. In certain aspects, system 140 may perform the distribution of the determined referral and/or sales rewards automatically and without input from the attorney and/or the financial services representative. For example, and as described above, system 140 may perform operations that initiate an electronic transfer of $50 to an financial services account held by the attorney at the financial institution or at other financial institutions. Additionally, and as described above, system 140 may execute software applications that, through a corresponding API call to a computer system of the e-commerce retailer (e.g., Starbucks™, Amazon.com™, etc.), generate and deliver to the attorney (e.g., through an appropriate email address) a pre-paid digital gift card loaded with the referral reward of $50. System 140 may perform operations that initiate an electronic transfer of $100 to a financial services account held by the financial services representative at the financial institution or at other financial institutions.

The disclosed embodiments are not limited to these exemplary distribution processes, and in additional embodiments, system 140 may perform any additional or alternate operations capable of obtaining and distributing financial and/or non-financial benefits to corresponding employees that are appropriate to the financial institution.

Further, although described in terms of processes that automatically distribute rewards without employee input, the disclosed embodiments are not limited to these exemplary distribution processes. In further embodiments, system 140 may determine that a number of candidate referral and sales rewards are appropriate to the identified customer referral and resulting customer activity, and may perform operations that transmit data indicative of the multiple candidate referral and sales rewards to corresponding devices held by the attorney and financial service representative (e.g., across network 120 using any of the exemplary communications protocols outlined above).

In certain aspects, the transmitted data may cause the attorney's device to present the candidate referral rewards to the financial services representative, and the attorney may provide input to the device selecting one or the candidate referral rewards for provision by system 140. Similarly, in some aspects, the provided data may cause the attorney's device to present the candidate sales rewards to the financial service representative, and the financial service representative may provide input to the device selecting one or the candidate sales rewards for provision by system 140. The devices may transmit the selected candidate referral and sales rewards to system 140, which may perform operations consistent with those described above to provision the selected referral and sales rewards to candidate ones of attorney and financial service representative.

In step 734, system 140 may further parse the hybrid block-chain ledger data to determine whether additional events (e.g., referrals, resulting activities, etc.) require analysis. If system 140 were to determine that no further events require analysis (e.g., step 734; NO), the exemplary method is then complete in step 740. If, however, system 140 were to identify additional referrals and/or resulting customer activities (e.g., step 734; YES), the exemplary method may pass back to step 706, and system 140 may determine whether the additional referrals and/or resulting customer activities are included in the event trigger list, as described above.

In some embodiments, after the customer opens the checking account, the customer may want a home loan and the financial services representative may provide a referral to a different unit within the financial institution. For instance, the referral may be made using client device 104 and communicated to a computing device within the home lending unit of the financial institution, such as client device 106. The referral and the subsequent customer activity may be communicated to system 140 via computing device 104 and/or computing device 106, and steps 703-734 can be repeated.

Further, if system 140 were to determine that the list of triggering events fails to include the identified customer referral or the identified customer activity (e.g., steps 706 and 716; NO), exemplary process may pass forward to step 734, and system 140 may determine whether additional events require analysis, as described above.

In the embodiments described above, system 140 may establish and maintain hybrid block-chain ledger architectures that detect and track occurrences of specific events and/or transactions (e.g., customer referrals and resulting customer activity) across the organization and further, that distribute various employee rewards based on the detected and racked occurrences. As described above, the disclosed embodiments may perform operations to disburse one or more of these rewards when a corresponding one of the customer referral and/or resulting customer activity represents a triggering event (e.g., and included within an event trigger list maintained in the hybrid block-chain ledgers, as described above).

The disclosed embodiments are, however, not limited to processes that distribute rewards based on a presence of a single triggering event within the hybrid block-chain ledgers maintained by system 140. In additional embodiments, the event trigger lists incorporated into these maintained hybrid block-chain ledgers may specify multiple triggering events that upon detection by system 140, cause system 140 to perform operations to disburse one or more rewards to corresponding employees in accordance with the rules engine, as described above. For example, the multiple trigger events may include, but are not limited to, a certain transaction value, sale, customer interaction, a referral, and/or a combination thereof.

Additionally, in certain disclosed embodiments, system 140 acts as a centralized authority for the organization(s) (e.g., the financial institution) and further, establishes and maintains one or more the hybrid block-chain data structures and corresponding side chains, as described above. In other embodiments, however, the employee devices that capture referral data and/or realized customer activities may also be configured (e.g., by executed software applications provided by system 140) to provide the captured data to one or more of peer systems 160. Peer systems 160 may, in some aspects, act as "miners" for hybrid block-chain ledgers consistent with the disclosed embodiments. For example, using any of the exemplary techniques outlined above, peer systems 160 may competitively process the received transaction data (either alone or in conjunction with other data) to generate additional ledger blocks, which may be appended to the hybrid block-chain ledgers and/or side chains and distributed across peer systems 160 (e.g., through a peer-to-peer network) and to other connected devices of system 100 (e.g., across network 120).

Systems and processes consistent with the disclosed embodiments may, in some aspects, integrate all communication channels into a single tracking system, and provides a platform upon which referrals can be monetized. These exemplary systems and processes can further increase the value proposition for each customer going through this interaction. Thus, disclosed embodiments this exhibit advantages over existing systems which leverage conventional block-chain ledgers.

The exemplary hybrid block-chain ledgers described above can further be augmented by allowing for incentives and payouts to occur in the transaction allowing for direct justification of the payouts. The augmentation would reduce the need to maintain records of all transaction, referrals and sales as it would be integrated into a single location in the hybrid block-chain ledgers.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A system, comprising:
a first client device;
a second client device coupled to the first client device; and
an apparatus coupled to the first client device and to the second client device, wherein the apparatus comprises a storage device and a processor coupled to the storage device, the storage device storing software instructions for controlling the processor that when executed configures the processor to:
generate a first ledger block that records referral data onto a distributed ledger, the referral data identifying a referral event and a first reward associated with the referral event;
receive a notification from at least one of the first client device or the second client device, wherein the notification is representative of a referral operation between the first client device and the second client device;
based on the notification and the referral data recorded onto the distributed ledger, determine that the referral operation between the first client device and the second client device represents the referral event;
obtain, from the first ledger block of the distributed ledger, encrypted rules data identifying rules established by a centralized authority, and decrypt the encrypted rules data using a master cryptographic key of the centralized authority;
based on the decrypted rules data, determine that a corresponding one of the rules exhibits a relationship with the referral event, the corresponding one of the rules specifying a second reward associated with the referral event, the second reward being established by the centralized authority;
when the first reward corresponds to the second reward, perform operations consistent with the corresponding one of the rules, the operations provisioning the second reward to at least one of the first or second client devices; and
generate updated referral data that reflects the provisioning of the second reward to the at least one of the first or second client devices, and record the updated referral data within a second ledger block of the distributed ledger.

2. The system of claim 1, wherein the first client device is associated with a first unit of an organization and the second client device is associated with a second unit of the organization, the first unit being different from the second unit of the organization.

3. The system of claim 1 wherein the first client device is associated with a first organization and the second client device is associated with a second organization, the first organization being separate from the second organization.

4. The system of claim 1, wherein the processor is further configured to:
when the first reward corresponds to the second reward, establish an accuracy of the first reward specified within the referral data;
generate report data regarding the established accuracy of the first reward; and
transmit the report data to at least one of the first client device or the second client device.

5. The system of claim 1, wherein:
the distributed ledger comprises a plurality of additional ledger blocks, each of the additional ledger blocks recording additional referral data that identifies an additional referral event and an additional reward; and
the processor is further configured to:
based on the additional referral data recorded within the additional ledger blocks, determine that the referral operation corresponds to one of the additional referral events;
identify the additional reward associated with the corresponding one of the additional referral events; and
when the additional reward corresponds to the second reward, perform the operations consistent with the corresponding one of the rules.

6. The system of claim 1, wherein:
the referral data identifies a plurality of first rewards associated with the referral event;
the distributed ledger comprises a plurality of first ledger blocks, each of the plurality of first ledger blocks recording a portion of the referral data that identifies the referral event and a different one of the plurality of first rewards.

7. A computer-implemented method, comprising:
generating, using at least one processor, a first ledger block that records referral data onto a distributed ledger, the referral data identifying a referral event and a first reward associated with the referral event;
receiving, using the at least one processor, a notification from at least one of the first client device or the second client device, wherein the notification is representative of a referral operation between the first client device and the second client device;
based on the notification and the referral data recorded onto the distributed ledger, determining, using the at least one processor, that the referral operation between the first client device and the second client device represents the referral event;
using the at least one processor, obtaining, from the first ledger block of the distributed ledger, encrypted rules data identifying rules established by a centralized authority, and decrypting the encrypted rules data using a master cryptographic key of the centralized authority;
based on the decrypted rules data, determining, using the at least one processor, that a corresponding one of the rules exhibits a relationship with the referral event, the corresponding one of the rules specifying a second reward associated with the referral event, the second reward being established by the centralized authority;
when the first reward corresponds to the second reward, and using the at least one processor, performing operations consistent with the corresponding one of the rules, the operations provisioning the second reward to at least one of the first or second client devices; and
using the at least one processor, generating updated referral data that reflects the provisioning of the second reward to the at least one of the first or second client devices, and recording the updated referral data within a second ledger block of the distributed ledger.

8. The method of claim 7, wherein the first client device is associated with a first unit of an organization and the second client device is associated with a second unit of the organization, the first unit being different from the second unit of the organization.

9. The method of claim 7, wherein the first client device is associated with a first organization and the second client device is associated with a second organization, the first organization being separate from the second organization.

10. The method of claim 7, further comprising:
when the first reward corresponds to the second reward, establishing an accuracy of the first reward specified within the referral data;
generating report data regarding the established accuracy of the first reward; and
transmitting the report data to at least one of the first client device or the second client device.

11. The method of claim 7, wherein:
the distributed ledger comprises a plurality of additional ledger blocks, each of the additional ledger blocks recording additional referral data that identifies an additional referral event and an additional reward; and
the method further comprises:
based on the additional referral data recorded within the additional ledger blocks, determining that the referral operation corresponds to one of the additional referral events;
identify the additional reward associated with the corresponding one of the additional referral events; and
when the additional reward corresponds to the second reward, performing the operations consistent with the corresponding one of the rules.

12. The method of claim 7, wherein:
the referral data identifies a plurality of first rewards associated with the referral event;
the distributed ledger comprises a plurality of first ledger blocks, each of the plurality of first ledger blocks recording a portion of the referral data that identifies the referral event and a different one of the plurality of first rewards.

13. A non-transitory computer-readable storage medium having computer-executable instructions embodied thereon, wherein, when executed by a processor, the computer-executable instructions cause the processor to:
generate a first ledger block that records referral data onto a distributed ledger, the referral data identifying a referral event and a first reward associated with the referral event;
receive a notification from at least one of the first client device or the second client device, wherein the notification is representative of a referral operation between the first client device and the second client device;
based on the notification and the referral data recorded onto the distributed ledger, determine that the referral operation between the first client device and the second client device represents the referral event;

obtain, from the first ledger block of the distributed ledger, encrypted rules data identifying rules established by a centralized authority, and decrypt the encrypted rules data using a master cryptographic key of the centralized authority;

based on the decrypted rules data, determine that a corresponding one of the rules exhibits a relationship with the referral event, the corresponding one of the rules specifying a second reward associated with the referral event, the second reward being established by the centralized authority;

when the first reward corresponds to the second reward, perform operations consistent with the corresponding one of the rules, the operations provisioning the second reward to at least one of the first or second client devices; and generate updated referral data that reflects the provisioning of the second reward to the at least one of the first or second client devices, and record the updated referral data within a second ledger block of the distributed ledger.

14. The non-transitory computer-readable storage medium of claim 13, wherein the first client device is associated with a first unit of an organization and the second client device is associated with a second unit of the organization, the first unit being different from the second unit of the organization.

15. The non-transitory computer-readable storage medium of claim 13, wherein the first client device is associated with a first organization and the second client device is associated with a second organization, the first organization being separate from the second organization.

16. The non-transitory computer-readable storage medium of claim 13, wherein the computer-executable instructions further cause the processor to:
when the first reward corresponds to the second reward, establish an accuracy of the first reward specified within the referral data;
generate report data regarding the established accuracy of the first reward; and
transmit the report data to at least one of the first client device or the second client device.

17. The non-transitory computer-readable storage medium of claim 13, wherein:
the distributed ledger comprises a plurality of additional ledger blocks, each of the additional ledger blocks recording additional referral data that identifies an additional referral event and an additional reward; and
the computer-executable instructions further cause the processor to:
based on the additional referral data recorded within the additional ledger blocks, determine that the referral operation corresponds to one of the additional referral events;
identify the additional reward associated with the corresponding one of the additional referral events; and
when the additional reward corresponds to the second reward, perform the operations consistent with the corresponding one of the rules.

18. The non-transitory computer-readable storage medium of claim 13, wherein:
the referral data identifies a plurality of first rewards associated with the referral event;
the distributed ledger comprises a plurality of first ledger blocks, each of the plurality of first ledger blocks recording a portion of the referral data that identifies the referral event and a different one of the plurality of first rewards;
the referral data identifying a referral event between the first and second client devices and a first reward associated with the referral event.

19. The system of claim 1, wherein the processor is further configured to:
when the referral operation represents the referral event, obtain encrypted triggering event data from the first ledger block;
decrypt the encrypted triggering event data using a private cryptographic key associated with the first client device or the second client device;
determine that the referral event corresponds to at least one triggering event identified within the decrypted triggering event data; and
obtain the encrypted rules data based on the determination that the referral event corresponds to the at least one triggering event.

20. The system of claim 1, wherein the processor is further configured to detect an occurrence of the referral event based on a determination that the referral operation between the first client device and the second client device represents the referral event.

21. The system of claim 1, wherein:
the first reward comprises a first outcome value, the first outcome value reflecting a consensus between the first client device and the second client device;
the second reward comprises a second outcome value established by the centralized authority;
the corresponding one of the rules specifies a disbursement of funds consistent with the second outcome value to a user of at least one or the first or second client devices; and
when the first outcome value corresponds to the second outcome value, the at least one processor is further configured to perform the operations consistent with the corresponding one of the rules, the operations disbursing the funds consistent with the second outcome value to the user of at least one or the first or second client devices.

22. The computer-implemented method of claim 7, further comprising:
when the referral operation represents the referral event, obtaining encrypted triggering event data from the first ledger block;
decrypting the encrypted triggering event data using a private cryptographic key associated with the first client device or the second client device;
determining that the referral event corresponds to at least one triggering event identified within the decrypted triggering event data; and
obtaining the encrypted rules data based on the determination that the referral event corresponds to the at least one triggering event.

23. The computer-implemented method of claim 7, wherein:
the first reward comprises a first outcome value, the first outcome value reflecting a consensus between the first client device and the second client device;
the second reward comprises a second outcome value established by the centralized authority;
the corresponding one of the rules specifies a disbursement of funds consistent with the second outcome value to a user of at least one or the first or second client devices; and when the first outcome value corresponds to the second outcome value, the computer-implemented method further comprises performing the operations consistent with the corresponding one of the rules, the operations disbursing the funds consistent with the second outcome value to the user of at least one or the first or second client devices.

* * * * *